US012634072B2

(12) United States Patent
Si et al.

(10) Patent No.: US 12,634,072 B2
(45) Date of Patent: May 19, 2026

(54) REFERENCE SIGNAL RESOURCE PROCESSING METHOD AND APPARATUS, DEVICE, AND READABLE STORAGE MEDIUM

(71) Applicant: VIVO MOBILE COMMUNICATION CO., LTD., Dongguan (CN)

(72) Inventors: Ye Si, Dongguan (CN); Yuanyuan Wang, Dongguan (CN); Huaming Wu, Dongguan (CN); Zixun Zhuang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 394 days.

(21) Appl. No.: 18/126,997

(22) Filed: Mar. 27, 2023

(65) Prior Publication Data

US 2023/0239093 A1    Jul. 27, 2023

Related U.S. Application Data

(63) Continuation of application No. PCT/CN2021/121370, filed on Sep. 28, 2021.

(30) Foreign Application Priority Data

Sep. 28, 2020    (CN) .......................... 202011043857.3

(51) Int. Cl.
  H04L 5/00          (2006.01)
  H04W 72/0453    (2023.01)

(52) U.S. Cl.
  CPC ....... H04L 5/0048 (2013.01); H04W 72/0453 (2013.01)

(58) Field of Classification Search
None
See application file for complete search history.

(56) References Cited

U.S. PATENT DOCUMENTS

| | | | |
|---|---|---|---|
| 2015/0195770 A1* | 7/2015 | Sun ....................... | H04W 48/12 |
| | | | 370/329 |
| 2019/0393970 A1* | 12/2019 | Kumar .................. | H04W 24/10 |
| 2022/0085945 A1* | 3/2022 | Manolakos ............. | H04W 8/22 |
| 2023/0020648 A1* | 1/2023 | Cha ........................ | G01S 5/0036 |
| 2023/0045122 A1* | 2/2023 | Qi .......................... | H04L 5/001 |

FOREIGN PATENT DOCUMENTS

| | | |
|---|---|---|
| CN | 107113569 A | 8/2017 |

OTHER PUBLICATIONS

International Search Report issued in corresponding International Application No. PCT/CN2021/121370, mailed Dec. 30, 2021, 4 pages.

(Continued)

*Primary Examiner* — Srinivasa R Reddivalam
(74) *Attorney, Agent, or Firm* — IPX PLLC

(57) ABSTRACT

A method for reference signal resource processing and apparatus, a device, and a readable storage medium are provided. The method includes: simultaneously processing first reference signal resources of one or more positioning frequency layers according to an agreement in a protocol or configuration on a network side or a selection by a terminal, where each first reference signal is used for positioning the terminal.

19 Claims, 4 Drawing Sheets

201

Simultaneously process PRS resources of one or more positioning frequency layers according to agreement in a protocol or configuration on a network side or selection on a terminal

(56) References Cited

OTHER PUBLICATIONS

Intel Corporation, "Output of email thread [100e-NR-Pos-DL-PRS-02]", 3GPP TSG RAN WG1 #100E R1-2001235, Mar. 2020, 19 pages.

Intel Corporation, "Further Discussion on NR PRS RSTD Requirements", 3GPP TSG-RAN WG4 Meeting # 95-e R4-2006556, Jun. 2020, 15 pages.

Intel Corporation, "Further Discussion on NR PRS RSTD Requirements", 3GPP TSG-RAN WG4 Meeting # 96-e R4-2009741, Aug. 2020, 9 pages.

* cited by examiner

201

Simultaneously process PRS resources of one or more positioning frequency layers according to agreement in a protocol or configuration on a network side or selection on a terminal

301

Configure such that a terminal simultaneously processes PRS resources of one or more positioning frequency layers

400

First processing module
401

500

Third processing module
501

REFERENCE SIGNAL RESOURCE PROCESSING METHOD AND APPARATUS, DEVICE, AND READABLE STORAGE MEDIUM

CROSS-REFERENCE TO RELATED APPLICATIONS

This application is a continuation of International Application No. PCT/CN2021/121370, filed Sep. 28, 2021, which claims priority to Chinese Patent Application No. 202011043857.3, filed Sep. 28, 2020. The entire contents of each of the above-referenced applications are expressly incorporated herein by reference.

TECHNICAL FIELD

The present application belongs to the technical field of communications, and specifically, relates to a reference signal resource processing method and apparatus, a device, and a readable storage medium.

BACKGROUND

To improve the positioning precision, a valid bandwidth of a positioning reference signal can be increased. Generally, a Positioning Reference Signal (PRS) is configured on a continuous frequency domain resource, but how a terminal processes a discontinuous PRS currently is not specified in a protocol.

SUMMARY

Embodiments of the present application provide a reference signal resource processing method and apparatus, a device, and a readable storage medium.

According to a first aspect, a reference signal resource processing method is provided, applied to a terminal, including:

simultaneously processing first reference signal resources of one or more positioning frequency layers according to agreement in a protocol or configuration on a network side or selection on a terminal, where a first reference signal is used for positioning of the terminal.

According to a second aspect, a reference signal resource processing method is provided, applied to a network side device, including:

configuring such that a terminal simultaneously processes first reference signal resources of one or more positioning frequency layers, where a first reference signal is used for positioning of the terminal.

According to a third aspect, a reference signal resource processing apparatus is provided, applied to a terminal, including:

a first processing module, configured to simultaneously process first reference signal resources of one or more positioning frequency layers according to agreement in a protocol or configuration on a network side or selection on a terminal.

According to a fourth aspect, a reference signal resource processing apparatus is provided, applied to a network side device, including:

a third processing module, configured to configure such that a terminal simultaneously processes first reference signal resources of one or more positioning frequency layers.

According to a fifth aspect, a terminal is provided, including: a processor, a memory, and a program stored in the memory and executable on the processor, where when the program is executed by the processor, the steps of the method in the first aspect are implemented.

According to a sixth aspect, a network side device is provided, including: a processor, a memory, and a program stored in the memory and executable on the processor, where when the program is executed by the processor, the steps of the method in the second aspect are implemented.

In a seventh aspect, a readable storage medium is provided, storing programs or instructions, where when the programs or the instructions are executed by a processor, the steps of the methods in the first aspect or in the second aspect are implemented.

According to a ninth aspect, a program product is provided, stored in a nonvolatile storage medium, where the program product is executed by at least one processor to implement the steps of the processing method in the first aspect or in the second aspect.

According to a tenth aspect, a chip is provided, including a processor and a communication interface, where the communication interface is coupled to the processor, and the processor is configured to run programs or instructions, to implement the processing methods in the first aspect or in the second aspect.

In the embodiments of the present application, the terminal may simultaneously process first reference signal resources of one or more positioning frequency layers, which increases a valid bandwidth of the first reference signal, and improves the positioning precision of the terminal.

DETAILED DESCRIPTION

Figures 1, 2, 3:
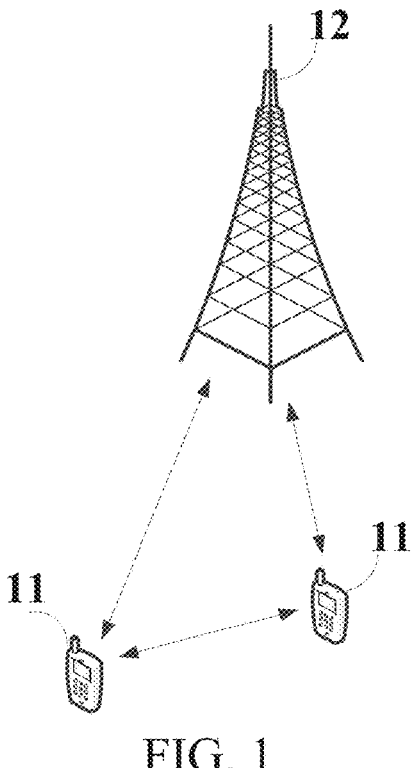
FIG. 1 is a block diagram of a wireless communication system to which an embodiment of the present application is applicable.
FIG. 2 is a schematic diagram 1 of a reference signal resource processing method according to an embodiment of the present application.
FIG. 3 is a schematic diagram 2 of a reference signal resource processing method according to an embodiment of the present application.

1. Positioning Frequency Layer.

In New Radio (NR) positioning, a PRS is introduced for a terminal to perform positioning measurement. To complete positioning, the terminal needs to measure PRSs sent by Transmission reception point (TRP) of a plurality of cells. To ensure high-precision positioning, a PRS with a larger bandwidth is generally configured on a network side (generally, the larger bandwidth of the PRS indicates higher positioning precision).

NR positioning also defines the concept of positioning frequency layer. The positioning frequency layer is a set of PRSs in a group of TRPs. These PRSs have a same subcarrier spacing, a same Cyclic Prefix (CP) type, a same reference point A, a same bandwidth, and a same comb size. One positioning frequency layer may include a plurality of TRPs, each TRP may include a plurality of PRS resource sets, and each PRS resource set may include a plurality of PRS resources.

2. Measurement Gap (MG):

In NR positioning, the terminal needs to use a measurement gap when measuring the PRS. When no measurement gap is configured, the terminal does not expect to process the PRS.

Currently, according to a terminal capability, only a PRS of one positioning frequency layer can be processed at a same moment.

When the terminal expects to measure a PRS resource outside an active Bandwidth Part (BWP) or a PRS resource different from an active BWP baseband parameter (numerology), the terminal may send request signaling to a serving next generation NodeB (gNB) to request configuration of a measurement gap. The serving gNB determines how to configure the measurement gap, and then sends a measurement gap configuration to the UE, and the UE can use the configured measurement gap to measure the PRS. However, if the serving gNB does not configure the measurement gap, the terminal can only measure the PRS in an active Downlink (DL) BWP.

In addition, in an existing protocol, the configuration of the PRS is directly sent to the terminal by a location server through long term evolution positioning protocol (LTE Positioning Protocol, LPP) signaling. The serving gNB does not know specific configuration information. When the terminal needs to use the measurement gap to measure the PRS, the terminal needs to request the measurement gap from the serving gNB.

The technical solutions in the embodiments of the present application are described in the following with reference to the accompanying drawings in the embodiments of the present application. Apparently, the described embodiments are some rather than all of the embodiments of the present application. All other embodiments obtained by a person of ordinary skill in the art based on the embodiments of the present application without creative efforts shall fall within the protection scope of the present application.

In the specification and claims of the present application, terms "first" and "second" are used to distinguish similar objects, but are not used to describe a specific order or sequence. It is to be understood that data used in this way is interchangeable in a proper circumstance, so that the embodiments of the present application may be implemented in an order other than the order illustrated or described herein. Objects distinguished by "first" and "second" are usually of the same type, and a quantity of the objects is not limited, for example, there may be one or more first objects. In addition, "and" in the specification and the claims represents at least one of connected objects, and a character "/" generally indicates an "or" relationship between associated objects.

It should be noted that the technologies described in the embodiments of the present application are not limited to a Long Term Evolution (LTE)/LTE-Advanced (LTE-A) system, and may further be used in other wireless communication systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems. The terms "system" and "network" in the embodiments of the present application are usually used interchangeably, and the described technologies can be applied to the systems and radio technologies mentioned above, and can also be applied to other systems and radio technologies. The following descriptions describe a New Radio (NR) system for the objective of being used as an example, and NR terms are used in most of the descriptions below. However, these technologies may also be applied to applications other than NR system applications, such as a 6th generation (6G) communication system.

FIG. 1 is a block diagram of a wireless communication system to which an embodiment of the present application is applicable. The wireless communication system includes a terminal 11 and a network side device 12. The terminal 11 may also be referred to as a terminal device or User Equipment (UE). The terminal 11 may be a terminal side device such as a mobile phone, a tablet personal computer, or a laptop computer, or called a notebook computer, a personal digital assistant (PDA), a palmtop computer, a netbook, an ultra-mobile personal computer (UMPC), a mobile internet device (MID), a wearable device, a vehicle user equipment (VUE), or a pedestrian user equipment (PUE). The wearable device includes bracelets, headphones, glasses, etc. It should be noted that a specific type of the terminal 11 is not limited in this embodiment of the present application. The network side device 12 may be a base station or a core network device, and the base station may be referred to as a NodeB, an evolved NodeB (eNB), an access point, a Base Transceiver Station (BTS), a radio base station, a radio transceiver, a Basic Service Set (BSS), an Extended Service Set (ESS), a home NodeB, a home evolved NodeB, a WLAN access point, a WiFi node, a Transmission Reception Point (TRP), or another appropriate term in the art. Provided that the same technical effect is achieved, the base station is not limited to specific technical vocabulary. It should be noted that the base station in an NR system is merely used as an example, but a specific type of the base station is not limited in the embodiments of the present application. The core network node includes a location server, such as a location server (LMF) in NR, or a location server in LTE, or a location server in a subsequent version.

A reference signal resource processing method and apparatus, a device, and a readable storage medium provided in the embodiments of the present application are described in detail below with reference to the accompanying drawings by using specific embodiments and application scenarios.

Referring to FIG. 2, an embodiment of the present application provides a reference signal resource processing method. The method may be executed by a terminal, and a specific step includes: step 201.

Step 201: Simultaneously process first reference signal resources of one or more positioning frequency layers according to agreement in a protocol or configuration on a network side or selection on a terminal.

It should be noted that the first reference signal is used for downlink positioning, such as a PRS, a Synchronization Signal and PBCH block (SSB), a CSI Reference Signal (CSI-RS), or a Tracking Reference Signal (TRS).

The first reference signal resources of the plurality of positioning frequency layers (for example, two positioning frequency layers or more than two positioning frequency layers) are processed, that is, for each TRP, the first reference signal resources of the plurality of positioning frequency layers are processed. The plurality of positioning frequency layers may include a same TRP list.

In some embodiments, the terminal may further process first reference signal resources of one positioning frequency layer according to agreement in a protocol or configuration on a network side or selection on a terminal.

It can be understood that "simultaneously" refers to a same moment (or a same time unit), for example, a same slot, a same subframe, or a same symbol.

It should be noted that processing includes: separate processing (or called non-aggregation processing) or aggregation processing.

Separate processing means: the first reference signals with discontinuous frequencies are only simultaneously measured, but no aggregation processing is performed, and the discontinuous first reference signals are calculated separately. As a result, a valid bandwidth is not increased.

Aggregation processing means: the first reference signals with discontinuous frequencies are simultaneously measured, aggregation processing is performed on the discontinuous first reference signals, and a valid bandwidth is increased.

A time-based positioning method (DL-TDOA, Multi-RTT) is used as an example.

Separate processing means: UE measures the plurality of positioning frequency layers, and obtains a time measurement value for each frequency layer. In some embodiments, results of all the frequency layers are averaged to finally obtain an averaged result, which does not increase the valid bandwidth and cannot effectively improve the measurement precision.

Aggregation processing means: UE aggregates the first reference signal resources of the plurality of positioning frequency layers, increases a valid bandwidth of the first reference signals, and obtains a corresponding time measurement value with higher precision.

In aggregation processing, processing of the discontinuous first reference signal resources is strongly coupled.

In some implementations, the terminal may simultaneously process the first reference signal resources of the one or more positioning frequency layers according to configuration information of the first reference signal.

In some embodiments, the configuration information includes: information of the positioning frequency layer, and the positioning frequency layer includes: a plurality of channel bandwidth parts.

Correspondingly, in step 201, aggregation processing or non-aggregation processing is performed on the first reference signal resources of the plurality of channel bandwidth parts of the positioning frequency layer according to the information of the positioning frequency layer.

In some embodiments, the configuration information includes: information of a positioning frequency layer group, and the positioning frequency layer group includes: a plurality of positioning frequency layers simultaneously sent.

Correspondingly, in step 201, the terminal may perform aggregation processing or non-aggregation processing on first reference signal resources of the plurality of positioning frequency layers in the positioning frequency layer group according to the information of the positioning frequency layer group.

It can be understood that the positioning frequency layer group may be equivalent to a positioning frequency layer aggregation group or an aggregation instruction. It can be understood as: when a configuration of the positioning frequency layer group is received, aggregation processing is performed on all the positioning frequency layers in the positioning frequency layer group.

In some implementations, the information of the positioning frequency layer group includes an aggregation instruction, where the aggregation instruction is used to instruct to perform aggregation processing on the first reference signal resources of the plurality of positioning frequency layers in the positioning frequency layer group. That is, if the information of the positioning frequency layer group does not include the aggregation instruction, the UE does not perform aggregation processing on the plurality of positioning frequency layers in the positioning frequency layer group.

In some implementations, the information of the positioning frequency layer group includes: information of the plurality of positioning frequency layers, and information of at least some positioning frequency layers includes: an aggregation instruction, where the aggregation instruction is used to instruct to perform aggregation processing on the first reference signal resources of the at least some positioning frequency layers.

In some implementations, the information of the positioning frequency layer group includes: information of a transmission reception point (TRP), and the information of the TRP includes: an aggregation instruction, where the aggregation instruction is used to instruct to perform aggregation processing on first reference signal resources of at least some positioning frequency layers of the TRP.

That is, in some embodiments, the aggregation instruction may also be configured at some positioning frequency layers in the positioning frequency layer group, and is used to instruct the UE to perform aggregation processing on specific positioning frequency layers in the group.

In some embodiments, the UE may select two or more positioning frequency layers in the positioning frequency layer group for aggregation processing. In some embodiments, the aggregation instruction may also be configured in a specific TRP in the positioning frequency layer group, and is used to instruct the UE to perform aggregation processing on first reference signals of all or some positioning frequency layers of the TRP.

In some implementations, features of the plurality of positioning frequency layers include one or more of the following:

(1) Subcarrier spacings of the first reference signals are the same.

(2) Comb sizes comb sizes of the first reference signals are the same.

(3) Products of subcarrier spacings of the first reference signals and comb sizes of the first reference signals are the same.

(4) Cyclic prefix (CP) types are the same.

(5) Specific reference points are the same, for example, reference points A are the same.

In some embodiments, for first reference signal frequency domain positions and first reference signal sequence generation and mapping of different positioning frequency layers of the plurality of positioning frequency layers, refer to the same point A in the positioning frequency layer group.

(6) Corresponding TRP lists are the same (or TRPs are the same).

That is, each TRP simultaneously transmits the plurality of first reference signal resources at different positioning frequency layers, and the UE performs aggregation processing. A frequency layer 1 includes 64 TRPs, and a frequency layer 2 includes the same TRPs as the frequency layer 1, that is, first reference signal resources at the frequency layer 2 and first reference signal resources at the frequency layer 1 come from the same TRPs, but frequency domain positions are different.

Further, TRP IDs of same TRPs at all the positioning frequency layers are the same. The TRP ID includes one or more of the following: a DL first reference signal ID, a Physical Cell ID (PCI), and an NR Cell Global Identifier (NCGI).

Further, the same TRPs at the plurality of positioning frequency layers may be understood as: the same TRPs send a plurality of first reference signal resources of the different positioning frequency layers. Further, the plurality of first reference signal resources can be simultaneously sent.

Further, the plurality of first reference signal resources simultaneously sent by the same TRP at different positioning frequency layers respectively belong to different first reference signal resource sets. That is, the same TRP simultaneously transmits different first reference signal resource sets at different positioning frequency layers.

In some embodiments, the same TRPs at the plurality of frequency layers have a same TRP-specific parameter in a TRP configuration, and the TRP-specific parameter includes one or more of the following: the TRPs correspond to first reference signal search window information (for example, expected RSTD and expected-RSTD-uncertain), a system frame number 0 (SFN0) offset, or the like.

In some implementations, at a same moment, in a same TRP, features of a plurality of first reference signal resources at the plurality of positioning frequency layers include one or more of the following:

(1) Associated spatial transfer filters are the same (or Quasi Co-Location (QCL) spatial reference signals are the same).

The plurality of first reference signal resources are sent from a same spatial transfer filter (a same beam). In some embodiments, antenna ports or antenna port indexes corresponding to the plurality of first reference signal resources are the same.

(2) Sequence identifiers are the same.

For example, downlink PRS sequence identifiers (dl-PRS-SequenceID) are the same.

(3) Resource element (RE) offsets (for example, dl-PRS-CombSizeN-and-ReOffset) are the same.

(4) Numbers of symbols (for example, dl-PRS-NumSymbols) are the same.

(5) Symbol offsets (for example, dl-PRS-ResourceSymbolOffset) are the same.

(6) Slot offsets (for example, dl-PRS-ResourceSlotOffset) are the same.

(7) Transmit powers (for example, dl-PRS-ResourcePower) are the same.

In some implementations, the plurality of first reference signal resources respectively belong to different first reference signal resource sets.

A feature of the first reference signal resource set includes one or more of the following:

(1) Periods (for example, dl-PRS-Periodicity) are the same.

(2) PRS resource set slot offsets (for example, ResourceSetSlotOffset) are the same.

(3) Repetition factors (for example, dl-PRS-ResourceRepetitionFactor) are the same.

(4) Repetition gaps (for example, dl-PRS-ResourceTimeGap) are the same.

(5) Muting patterns are the same.

For example, at least one of a downlink PRS muting pattern option 1 (dl-PRS-MutingOption1) or a downlink PRS muting pattern option 2 (dl-PRS-MutingOption2) is included.

(6) Numbers of resources are the same.

In some implementations, the method further includes: obtaining first information configured on the network side, where the first information indicates one or more of the following:

(1) Reference positioning frequency layer (or called an associated positioning frequency layer) of the plurality of positioning frequency layers.

In some embodiments, the network may indicate a specific positioning frequency layer of the plurality of positioning frequency layers as a reference positioning frequency layer (or an associated positioning frequency layer). That is, when some parameters of other positioning frequency layers are the same as those of this positioning frequency layer, these parameters may be configured by default and corresponding parameter values of the reference positioning frequency layer are reused, to reduce overheads.

In some embodiments, a reference positioning frequency layer ID is indicated in other positioning frequency layer parameters. For example, when the reference positioning frequency layer ID is configured, some parameters of the positioning frequency layer can be defaulted; otherwise, parameters cannot be defaulted.

In some embodiments, the reference positioning frequency layer may be the first positioning frequency layer in a list of the plurality of positioning frequency layer; or the network indicates a positioning frequency layer ID of the reference positioning frequency layer as the reference positioning frequency layer.

(2) At least one resource set of each TRP at the reference positioning frequency layer is a reference resource set.

Further, at least one resource set at each TRP at the reference positioning frequency layer may be used as a reference resource set (or an associated resource set). That is, when parameters in another resource set in the same TRP corresponding to another positioning frequency layer are the same as those in the reference resource set, these parameters may be configured by default and corresponding parameter values in the reference resource set are reused.

(3) At least one resource of each TRP at the reference positioning frequency layer is a reference resource.

In some implementations, the information of the positioning frequency layer group further includes one or more of the following: an identifier of the positioning frequency layer group; and identifiers of the plurality of positioning frequency layers.

In some embodiments, the network indicates at least one resource set in each TRP as a reference resource set (or an associated resource set).

In some embodiments, the reference resource set ID is indicated in a configuration of another positioning frequency layer of the same TRP.

In some embodiments, at least one resource set comes from a same positioning frequency layer of the same TRP, such as the reference positioning frequency layer.

In some embodiments, at least one resource set of each TRP is at least one resource set of the reference positioning frequency layer.

In some embodiments, the network indicates at least one resource of each TRP as a reference resource (or an associated resource).

In some embodiments, the reference resource ID (including at least a resource ID and a resource set ID) is indicated in a configuration of another positioning frequency layer of the same TRP.

In some embodiments, at least one resource set comes from a same positioning frequency layer of the same TRP, such as the reference positioning frequency layer, or comes from a same resource set of the same TRP, such as the reference resource set.

In some embodiments, one or more positioning frequency layer groups can be configured; each positioning frequency layer group includes a positioning frequency layer group identifier (ID); and each positioning frequency layer group includes a plurality of positioning frequency layer identifiers (ID). The positioning frequency layer identifier can be an intra-group ID or a non-intra-group ID (a global identifier (global ID) determined according to the number of positioning frequency layers).

In some implementations, the method further includes: receiving second information, where the second information indicates one or more of the following:

(1) Priority of the positioning frequency layer group.

That is, priorities of different positioning frequency layer groups. In some embodiments, the reference positioning frequency layer in the positioning frequency layer group has the highest priority.

(2) Priority of a positioning frequency layer in the positioning frequency layer group.

That is, priorities of different positioning frequency layers in each positioning frequency layer group.

(3) Priority of a TRP corresponding to the positioning frequency layer group.

That is, priorities of different TRPs in each positioning frequency layer group. The UE may sequentially process the plurality of positioning frequency layers corresponding to different TRPs according to the priority order of the TRPs.

(4) Priority of measurement and/or aggregation processing on a measurement object.

That is, the UE is instructed to at least perform measurement and/or aggregation processing on a measurement object above a specific priority.

In some implementations, before the terminal simultaneously processes the first reference signal resources of the plurality of positioning frequency layers, the method further includes: receiving third information, where the third information includes one or more of the following:

(1) Aggregation instruction, where the aggregation instruction is used to instruct to perform aggregation processing on all or some of the plurality of positioning frequency layers.

In some embodiments, the aggregation instruction further includes a TRP indication, indicating to perform aggregation processing on first reference signal resources of all or some positioning frequency layers of the plurality of positioning frequency layers of specific TRPs.

(2) Timing offsets in a case that different positioning frequency layers of a same TRP send the first reference signals.

In some embodiments, the timing offset is a timing offset relative to a positioning frequency layer (or a reference resource set, or a reference resource, or a positioning frequency layer indicated by the network/specified in a protocol). The timing offsets can also be understood as: timing offsets that are of different positioning frequency layers and that exist when the same TRPs send PRSs at different positioning frequency layers.

In some embodiments, the timing offset may include at least one of a system frame offset (for example, a specific system frame offset or an SFN0 offset), a subframe offset (for example, a subframe0 offset), or a slot offset. A granularity or a unit can be Ts (the most basic time unit of LTE), Tc (the smallest time unit defined by NR), slot, subframe, millisecond (ms), nanosecond (ns), microsecond (us), and the like. In some embodiments, a parameter represented by (2) may be a carrier aggregation offset (CA-offset).

In some embodiments, a unit of the CA-offset is slot, and indicates an SFN0 offset between a specific positioning frequency layer and the reference positioning frequency layer based on a current subcarrier spacing (SCS) (for example, an SCS of the positioning frequency layer group). The SCS may be an SCS of a current positioning frequency layer, a plurality of positioning frequency layers, or a positioning frequency layer group.

(3) Band indicator of the positioning frequency layer.

For example, the band indicator is indicated in a parameter of the positioning frequency layer.

(4) Positioning frequency layer processing indication (or a positioning frequency layer baseband processing indication), indicating at least two positioning frequency layers received and/or processed by a same module.

In some embodiments, a receiving module includes one or more of the following: a baseband receiver; a radio frequency link; a filter, such as a baseband filter or a band filter; and a receive antenna, for example, the UE supports 2Tx and 2Rx, and 1 bit is used to indicate 1Rx or 2Rx.

(5) Positioning frequency layer aggregation relationship indication.

In some embodiments, if adjacent positioning frequency layers are in a same band, the network indicates that a relationship between the positioning frequency layers is intra-band continuous carrier aggregation or intra-band discontinuous carrier aggregation.

In some embodiments, if adjacent positioning frequency layers are in a same band, the network indicates whether a relationship between the positioning frequency layers is on a same carrier. In some embodiments, for adjacent positioning frequency layers on the same carrier, the network further indicates whether the positioning frequency layers are continuous in frequency domain.

"Adjacent" may mean at least two positioning frequency layers that are adjacent in frequency domain.

(6) Phase offset, power offset, frequency offset, and/or frequency error between different positioning frequency layers of a same TRP.

In some embodiments, the phase offset may be a phase offset between two positioning frequency layers. The phase offset may be caused because different positioning frequency layers are sent from different radio frequency devices.

In some embodiments, the power offset may be a power offset of an energy per resource element (EPRE) between two positioning frequency layers.

In some embodiments, the frequency offset may be a frequency offset between center frequencies or carrier frequencies of two positioning frequency layers. A unit of the frequency offset may be hertz (Hz), or a resource block (RB), or a difference between absolute radio frequency channel numbers (ARFCN).

In some embodiments, the frequency error may be a frequency offset error between two positioning frequency layers caused by a frequency drift.

In some embodiments, the phase offset, the power offset, the frequency offset, and/or the frequency error may be relative values relative to a specific positioning frequency layer. The specific positioning frequency layer may be a reference positioning frequency layer or a positioning frequency layer indicated by the network.

(7) QCL relationship between first reference signal resources of different positioning frequency layers of a same TRP.

In some embodiments, the QCL relationship may include one or more of QCL-A, QCL-C, QCL-D, QCL C+QCL-D, and QCL A+QCL-D.

In some embodiments, RS identifier information of the first reference signal resource includes one or more of the following: a TRP ID, a first reference signal resource set ID, a first reference signal resource ID, and a positioning frequency layer ID.

In some implementations, the positioning frequency layer aggregation relationship indication includes an indication of a relationship between positioning frequency layers that are adjacent in frequency domain, and the relationship includes one or more of the following:

(1) Intra-band continuous carrier aggregation.

(2) Intra-band discontinuous carrier aggregation.

(3) On a same carrier.

In some implementations, a plurality of positioning frequency layers in each TRP correspond to the same third information. That is, the third information may be indicated per TRP. The TRP is a TRP in a same TRP list included in the positioning frequency layer group or the plurality of positioning frequency layers.

In some implementations, the method further includes: receiving fourth information, where the fourth information instructs to simultaneously update some parameters of first reference signal resources of positioning frequency layers of one or more TRPs.

In some embodiments, before receiving the fourth information, the UE receives an indication from the network side device, where the indication indicates positioning frequency layers whose parameters can be simultaneously updated. For example, one or more of the positioning frequency layer group, the positioning frequency layer ID list, and the TRP list are indicated to the UE.

In some embodiments, the fourth information includes one or more of the following: QCL indications of different positioning frequency layers of a TRP, SFN offsets of different positioning frequency layers of a TRP, a TRP ID, a positioning frequency layer ID, a positioning frequency layer group ID, and update parameter indication information.

In some embodiments, different positioning frequency layers of a same TRP indicate same QCL information.

In some embodiments, the fourth information may be one of Radio Resource Control (RRC), a media access control control element (MAC CE), downlink control information (DCI), or LTE positioning protocol (LPP).

In some implementations, the terminal may further process a first reference signal resource of one positioning frequency layer according to agreement in a protocol or configuration on a network side or selection on a terminal.

In some embodiments, the method further includes: before the terminal processes a first reference signal resource of a positioning frequency layer, receiving indication information sent by the network side device, where indicated content is as follows: indicating a plurality of channel bandwidth parts, and indicating that the positioning frequency layer includes a plurality of channel bandwidth parts.

Further, each channel bandwidth part includes continuous PRBs including the first reference signal.

Further, for each channel bandwidth, a start PRB and a bandwidth (a number of PRBs corresponding to the bandwidth) relative to a reference point are configured.

In some embodiments, the reference point may be a reference point of the positioning frequency layer, or a start PRB position of the positioning frequency layer. In some embodiments, reference points can be configured separately for the plurality of channel bandwidth parts, or a same reference point may be shared between the plurality of channel bandwidth parts.

Further, the channel bandwidth part includes a corresponding channel bandwidth part ID.

Further, a phase offset, a frequency offset, a time offset, a channel spacing, power imbalance, and the like between the plurality of channel bandwidth parts are also indicated.

Further, the relationship between the plurality of 'channel bandwidth parts' is indicated, to further instruct to the UE how to perform processing.

Further, a channel bandwidth part processing indication (or a positioning frequency layer baseband processing indication) is included, indicating at least two channel bandwidth parts received and/or processed by a same module.

In some embodiments, the channel bandwidth part may represent a plurality of carriers included at the positioning frequency layer.

In some embodiments, an 'aggregation instruction' is configured to instruct the terminal to perform aggregation processing on all or some of the plurality of channel bandwidth parts.

In some embodiments, when the 'aggregation instruction' is not configured, the terminal processes all or some of the first reference signal resources of the plurality of channel bandwidth parts respectively, or the terminal assumes that the plurality of channel bandwidth parts are a complete first reference signal sequence, and performs processing according to a complete first reference signal sequence.

In some embodiments, indicating the plurality of channel bandwidth parts also includes performing aggregation processing on the plurality of channel bandwidth parts.

In some embodiments, if the plurality of 'channel bandwidth parts' are not indicated, the terminal processes a first reference signal of a positioning frequency layer according to continuous first reference signals (that is, normal processing).

In some embodiments, the indication of the plurality of 'channel bandwidth parts' may be configured per TRP, or may be configured per positioning frequency layer. In some embodiments, the per TRP configuration is per TRP configuration at each positioning frequency layer.

In some implementations, before the terminal processes the first reference signal resources of the plurality of positioning frequency layers, the network configures the plurality of positioning frequency layers in advance, and activates at least one of the positioning frequency layers. The terminal processes a first reference signal resource of the at least one positioning frequency layer by default.

Further, the at least one positioning frequency layer may be a 'primary positioning frequency layer'.

Further, before processing at least one first reference signal resource, the terminal receives a dynamic indication sent by the network device, where the indication is used to activate at least one new positioning frequency layer.

Further, the terminal processes the first reference signal resource by using the 'primary positioning frequency layer' and the new positioning frequency layer.

In some embodiments, an associated identifier for activating a new positioning frequency layer includes one or more of the following: a positioning frequency layer ID, a TRP ID, a resource set ID, a resource ID, and the like.

When it is instructed to activate a specific resource set ID or resource ID, activating a new positioning frequency layer may also be understood as activating a resource or a resource set of the new positioning frequency layer. In other words, activating the resource set or the resource can also be understood as activating a first reference signal of a positioning frequency layer.

The TRP ID indicates a TRP in which the activated positioning frequency layer is located. Further, if the TRP is not activated, the signaling is also used to activate the TRP.

In some embodiments, activation/deactivation signaling includes at least one of a MAC CE or DCI. The signaling configured in advance includes at least one of RRC, LPP, or broadcast signaling.

In some embodiments, after processing the first reference signal, the terminal receives a deactivation indication. At least one positioning frequency layer is deactivated.

In some embodiments, the indication can be configured per TRP, or configured per UE.

In some embodiments, activating a new positioning frequency layer may be activating a new positioning frequency layer of one or some or all TRPs.

In some implementations, before the terminal processes the first reference signal resources of the plurality of positioning frequency layers, the network configures parameters of the plurality of TRPs in advance, and activates some of the TRPs. The terminal processes first reference signals of the some TRPs by default.

In some embodiments, the activated plurality of TRPs may be a 'primary TRP group'.

Further, before the UE processes the first reference signal, the UE receives a dynamic indication for activating at least one new TRP. The UE processes first reference signals of the 'primary TRP group' and the new TRP.

In some embodiments, an associated identifier for activating a new TRP includes one or more of the following: a TRP ID and a positioning frequency layer ID.

In some embodiments, the positioning frequency layer ID is used to indicate a positioning frequency layer of the TRP. In some embodiments, the positioning frequency layer ID is also used to indicate a positioning frequency layer to be activated in the TRP.

In some embodiments, after the measurement ends, the terminal receives a deactivation indication, and deactivates at least one TRP.

In some embodiments, activation/deactivation signaling includes at least one of a MAC CE or DCI. The signaling configured in advance includes at least one of RRC, LPP, or broadcast signaling.

In some implementations, the method further includes: receiving first reference signal resources of a plurality of positioning frequency layers of a same TRP at a same moment; and in a case that a preset condition is met, expecting, by the terminal, to perform aggregation processing on the first reference signal resources of the plurality of positioning frequency layers;

The preset condition includes one or more of the following:

(1) The plurality of positioning frequency layers belong to a same positioning frequency layer group, or the plurality of positioning frequency layers belong to one positioning frequency domain layer group, and information of the positioning frequency domain layer group includes an aggregation instruction.

(2) Information of the plurality of positioning frequency layers includes an aggregation instruction.

(3) The first reference signal resources of the plurality of positioning frequency layers satisfy a preset feature.

In some implementations, the preset feature includes one or more of the following:

(1) The first reference signals of the plurality of positioning frequency layers are sent from a same spatial filter.

(2) Timing offsets of the first reference signals of the plurality of positioning frequency layers are less than (or do not exceed) a first threshold.

(3) Received power parameters of the first reference signals of the plurality of positioning frequency layers are less than a second threshold.

(4) A center frequency offset between different positioning frequency layers of the plurality of positioning frequency layers is less than a third threshold.

(5) A frequency domain channel spacing between different positioning frequency layers of the plurality of positioning frequency layers is less than a fourth threshold.

(6) A phase offset between different positioning frequency layers of the plurality of positioning frequency layers is less than a fifth threshold.

It can be understood that the first threshold, the second threshold, the third threshold, the fourth threshold, and the fifth threshold may be specified by the protocol or indicated by the network side.

In some implementations, the method further includes: before simultaneously processing the first reference signals of the plurality of positioning frequency layers, receiving a measurement gap configuration, where the measurement gap configuration is used to simultaneously measure the first reference signals of the one or more positioning frequency layers.

In some implementations, the simultaneously processing first reference signal resources of one or more positioning frequency layers according to configuration on a network side includes: according to the measurement gap configuration, simultaneously processing the first reference signal resources of the one or more positioning frequency layers in one measurement gap; or according to the measurement gap configuration, simultaneously processing the first reference signal resources of the plurality of positioning frequency layers at the same time in a plurality of measurement gaps separately.

In some implementations, in a case that the terminal simultaneously processes the first reference signal resources of the one or more positioning frequency layers in one measurement gap, the measurement gap configuration includes one or more of the following:

(1) Measurement gap length.

(2) Measurement gap period.

(3) Measurement gap timing advance.

(4) A plurality of pieces of frequency information associated with the measurement gap.

That is, frequencies on which measurement may be performed by using the measurement gap.

(5) A plurality of pieces of positioning frequency layer identifier information associated with the measurement gap.

In some embodiments, at least one or more of the positioning frequency layer group ID and the positioning frequency layer ID is included.

(6) Measurement gap type indication.

That is, the type of the measurement gap is indicated, for example, the plurality of positioning frequency layers may be simultaneously measured in the type of the measurement gap.

In some implementations, the method further includes: sending a first request to a network side device, where the first request is used to request the network side device to configure a measurement gap, and the first request includes one or more of the following:

(1) Measurement gap request indication.

(2) Frequency information of the plurality of positioning frequency layers.

That is, frequency information corresponding to each of at least one positioning frequency layer (for example, a frequency A (point A) corresponding to each positioning frequency layer or a center frequency of each positioning frequency layer, which is represented by an ARFCN). In other words, in some embodiments, one measurement gap request corresponds to frequency information of the plurality of positioning frequency layers.

(3) Simultaneous processing indication.

That is, the UE is instructed to simultaneously measure and process the first reference signal of the at least one positioning frequency layer. In some embodiments, the UE is also instructed to simultaneously measure and process the first reference signal of the at least one positioning frequency layer in one measurement gap.

(4) Measurement gap type indication.

That is, the indication indicates a type of measurement gap that the UE requests, for example, the UE requests a measurement gap that can be used to simultaneously measure the first reference signal resources of the plurality of positioning frequency layers.

(5) Measurement gap period.

(6) Measurement gap period offset.

(7) Positioning frequency layer identifier information.

In some embodiments, the measurement gap is configured only during positioning (or downlink positioning reference signal measurement). In some embodiments, the measurement gap is only used for positioning (or downlink positioning reference signal measurement).

In some implementations, the measurement gap is configured according to a request for each positioning frequency layer group (or the plurality of positioning frequency layers).

In some implementations, in a case that the terminal simultaneously processes the first reference signal resources of the plurality of positioning frequency layers according to the plurality of measurement gaps, the measurement gap configuration includes first configuration information, and the first configuration information includes one or more of the following:

(1) Positioning frequency layer identifier information associated with each measurement gap.

(2) Frequency information associated with each measurement gap.

In some implementations, the measurement gap configuration further includes second configuration information, and the second configuration information includes one or more of the following:

(1) Measurement gap length.

(2) Measurement gap period.

(3) Measurement gap period offset.

(4) Measurement gap timing advance.

In some implementations, the measurement gap configuration further includes: a measurement gap group, the measurement gap group includes a plurality of measurement gaps whose at least some features are the same, a common configuration of the measurement gap group includes the second configuration information (or the second configuration information of the plurality of measurement gaps in the measurement gap group is the same), and an independent configuration of the measurement gap group includes the first configuration information.

In some implementations, the method further includes: sending a second request to the network side device, where the second request is used to request the network side device to configure a plurality of measurement gaps, and the second request includes one or more of the following:

(1) Simultaneous processing indication.

That is, the UE is instructed to simultaneously measure and process the first reference signal of the at least one positioning frequency layer. In some embodiments, the UE is also instructed to simultaneously measure and process the first reference signal of the at least one positioning frequency layer in the plurality of measurement gaps.

(2) Measurement gap type indication.

That is, the indication indicates a type of measurement gap that the UE requests, for example, the UE requests a plurality of gaps for simultaneously performing measurement.

(3) Frequency information corresponding to the plurality of positioning frequency layers.

That is, frequency information corresponding to a positioning frequency layer may be placed in a request of each positioning frequency layer or a common request of the plurality of positioning frequency layers.

(4) Measurement gap period.

(5) Measurement gap period offset.

(6) Measurement gap length.

(7) Number of measurement gaps.

(8) A plurality of pieces of positioning frequency layer identifier information.

In some embodiments, the measurement gap is configured only during positioning (or downlink positioning reference signal measurement). In some embodiments, the measurement gap is only used for positioning (or downlink positioning reference signal measurement).

In some implementations, the measurement gap is configured according to a request for each positioning frequency layer group (or the plurality of positioning frequency layers).

In some implementations, the method further includes: for a first reference signal resource of a positioning frequency layer, if the first reference signal resource is interrupted in frequency domain (or the frequency domain is interrupted), skipping, by the terminal, expecting to process the first reference signal resources.

In some implementations, the method further includes: measuring a first reference signal resource that is discontinuous in frequency domain, and reporting fifth information.

The fifth information includes one or more of the following:

(1) Measurement result of a first reference signal resource that is discontinuous in frequency domain.

(2) Reason for discontinuity in frequency domain.

For example, a frequency domain position of the first reference signal is occupied by an SSB or another signal/channel.

(3) Whether to perform aggregation processing on first reference signal resources that are discontinuous in frequency domain.

(4) Frequency domain position information of the first reference signal resources that are discontinuous in frequency domain.

For example, a number of RBs and start point information of discontinuous first reference signal blocks.

In some implementations, the method further includes:

after simultaneously processing the first reference signal resources of the one or more positioning frequency layers, measuring the first reference signal resources of the plurality of positioning frequency layers and reporting a measurement result.

In some implementations, the measurement result includes: a result of aggregation processing and/or a result of non-aggregation processing.

In some implementations, the result of aggregation processing includes one or more of the following:

(1) Indication information of the aggregated positioning frequency layers.

(2) Identifier information corresponding to the measurement result.

(3) Whether to compensate one or more of a phase offset, a power offset, a frequency offset, and a frequency error.

In some implementations, the result of non-aggregation processing includes one or more of the following:

(1) Separate measurement result of each positioning frequency layer.

(2) Measurement result of a first path (time, power, or the like), phase information of each positioning frequency layer, or the like.

(3) Reason for non-aggregation processing.

(4) Measurement result of aggregation estimation of the plurality of positioning frequency layers.

In this embodiment of the present application, the UE reports the measurement result obtained after simultaneously processing the plurality of positioning frequency layers. A result of a TRP includes one or more of the following.

(1) The measurement result is one or more of RSTD, RSRP, and RX-TX.

(2) Whether the reported measurement result is a measurement result obtained after aggregation processing.

(3) Reported result of aggregation processing.

In some embodiments, the result obtained after aggregation processing may be all or some measurement results of the plurality of positioning frequency layers.

In some embodiments, positioning frequency layers whose first reference signal resources are aggregated are also reported, and can be indicated in one of the following manners:

(i) positioning frequency layer related identifier, for example, one or more of a positioning frequency layer ID or a positioning frequency layer group ID;

(ii) first reference signal resource set related identifier, for example, a PRS resource set ID;

(iii) first reference signal resource related identifier, for example, a PRS resource set ID+a PRS resource ID;

(iv) TRP related identifier, for example, different TRP IDs of a plurality of positioning frequency layers of a same TRP; and (v) frequency related information, for example, an ARFCN indicates a positioning frequency layer associated with a measurement result.

In some embodiments, if the UE has aggregated corresponding positioning frequency layers according to the instruction of the network side device, 'aggregated positioning frequency layers are not indicated'.

In some embodiments, if the UE has aggregated all positioning frequency layers according to the instruction of the network side device, 'that all the positioning frequency layers are aggregated is indicated' or 'aggregated positioning frequency layers are not indicated'.

In some embodiments, identifier information corresponding to the measurement result is reported.

In some embodiments, a group of ID combinations associated with the measurement result is reported, and includes one or more of a TRP ID, a first reference signal resource set ID, and a first reference signal resource ID.

The plurality of positioning frequency layers are simultaneously processed, and for a same TRP, a plurality of resource sets and resources may be processed correspondingly. During reporting, the UE does not need to report an ID related to a first reference signal corresponding to each positioning frequency layer, and only reports an ID corresponding to one positioning frequency layer, and the network can obtain first reference signal resources corresponding to the measurement result.

Further, this group of ID combinations comes from a specific positioning frequency layer of the aggregated plurality of positioning frequency layers, for example, the reference positioning frequency layer in the positioning frequency layer group.

In some embodiments, the positioning frequency layer group ID is reported, and indicates a positioning frequency layer group in which the measurement result is measured.

In some embodiments, a plurality of ID combinations corresponding to measurement results of a plurality of TRPs may come from a same frequency layer.

In some embodiments, in aggregation processing reporting, an indication indicating whether the following information is compensated is further included: one or more of a phase offset, a power offset, a frequency offset, and a frequency error.

(4) Reported result of non-aggregation processing.

In some embodiments, a separate measurement result of each positioning frequency layer is also reported.

In some embodiments, a measurement result of a first path (time, power, or the like), phase information of each positioning frequency layer, or the like is also reported.

In some embodiments, the reason for non-aggregation processing is also reported. For example, an aggregation processing condition is not met, a UE capability does not support aggregation processing, or non-aggregation can meet a precision requirement.

In some embodiments, a measurement result of aggregation estimation of the plurality of positioning frequency layers is also reported.

Further, an aggregation estimation method, positioning frequency layers used for aggregation estimation, and the like are also reported.

(5) Measurement result of each positioning frequency layer.

(6) Time stamp information corresponding to the measurement result.

In some embodiments, identifier information associated with the time stamp includes at least one of a TRP ID, a resource set ID, a frequency layer ID, a frequency layer group ID, an NCGI, a PCI, or an ARFCN, and is used to indicate a frequency layer and a TRP of the frequency layer associated with the time stamp.

In some implementations, the measurement result includes: positioning frequency layers that are processed to obtain the measurement result. For example, for an RSTD measurement result of a TRP, the terminal reports that the measurement result is obtained by performing aggregation processing on a positioning frequency layer 1 and a positioning frequency layer 2. In some embodiments, the terminal reports whether the measurement of the frequency layer is obtained through measurement of a measurement gap or BWP measurement. Further, the terminal reports type information of the measurement gap.

In some implementations, the measurement result includes: 'channel bandwidth parts' that are of positioning frequency layers and that are processed to obtain the measurement result. For example, the measurement result reported by the terminal is obtained by performing aggregation processing on the second and third 'channel bandwidth parts' of the positioning frequency layer 1.

In some implementations, the method further includes: reporting a terminal capability of the terminal, where the terminal capability includes one or more of the following:

(1) Whether to support simultaneous measurement of the first reference signal resources of the plurality of positioning frequency layers.

(2) Whether to support simultaneous aggregation processing of the first reference signal resources of the plurality of positioning frequency layers.

Further, the capability that is for performing aggregation processing on the plurality of positioning frequency layers and that is reported by the UE is not greater than a capability that is for simultaneous measurement of the plurality of positioning frequency layers and that is reported by the UE.

(3) Whether to support measurement of the first reference signal resources of the plurality of positioning frequency layers in one measurement gap.

(4) Whether to support simultaneous measurement of the first reference signal resources of the plurality of positioning frequency layers in a plurality of measurement gaps separately.

(5) Whether to support measurement of the first reference signal resources of the plurality of frequency layers without using a measurement gap.

(6) Whether to support aggregation processing of first reference signal resources that are discontinuous in frequency domain at one positioning frequency layer.

(7) Number of positioning frequency layer groups supported by the terminal.

In some implementations, in a case that the terminal supports simultaneous measurement of the plurality of positioning frequency layers and/or supports simultaneous aggregation processing of the plurality of positioning frequency layers, the terminal capability further includes one or more of the following:

(1) Types of the plurality of positioning frequency layers on which simultaneous measurement and/or aggregation processing is performed.

(2) One or more of a maximum channel spacing channel spacing, a timing offset timing offset, a phase offset phase offset, a frequency error, and power imbalance between positioning frequency layers on which simultaneous measurement and/or aggregation processing is performed.

In some embodiments, being between positioning frequency layers may mean being between adjacent positioning frequency layers, or being between any two positioning frequency layers.

(3) Frequency domain buffer capability type.

Type 1: For the first reference signal that is discontinuous in frequency domain, an entire frequency domain bandwidth occupied by all first reference signals between the lowest frequency domain position and the highest frequency domain position is buffered.

In some embodiments, the frequency domain bandwidth occupied by all the first reference signals may be a band bandwidth occupied by all the first reference signals.

Type 2: For the first reference signal that is discontinuous in frequency domain, the first reference signal that is discontinuous in frequency domain is buffered based on segments.

In some embodiments, only the frequency domain bandwidth occupied by the first reference signal is buffered.

(4) Capability for separately processing a positioning frequency layer, for example, {N, T} means that when a maximum supported bandwidth reported by the terminal is B (for example, a unit is MHz), this indicates duration (for example, a unit is ms) of first reference signal symbols that may be processed by the terminal every T time (for example, a unit is ms).

(5) Capability for simultaneously measuring and/or performing aggregation processing on the plurality of positioning frequency layers, for example, {N1, T1} means that in simultaneous measurement and/or aggregation processing of the plurality of positioning frequency layers, this indicates duration (for example, a unit is ms) of first reference signal symbols that may be processed by the terminal every T1 time (for example, a unit is ms).

In some embodiments, the capability for simultaneously measuring and/or performing aggregation processing on the plurality of positioning frequency layers is related to one or more of the following: (i) positioning frequency layer aggregation type; (ii) number of positioning frequency layers to be aggregated; (iii) total bandwidth of positioning frequency layers to be aggregated; (iv) bandwidth of each DL of positioning frequency layers to be aggregated; (v) one or more of a channel spacing, a timing offset, a phase offset, a frequency error, and power imbalance between positioning frequency layers; (vi) whether to configure a measurement gap; (vii) frequency domain buffer capability type; and (viii) time domain buffer capability type.

In some embodiments, the terminal may report, based on each band or each frequency band combination, the capability for simultaneously measuring and/or performing aggregation processing on the plurality of positioning frequency layers.

In some embodiments, when the terminal reports the capability for performing aggregation processing on the plurality of positioning frequency layers, the terminal reports an equivalent bandwidth of aggregation processing of the plurality of positioning frequency layers. In some embodiments, the equivalent bandwidth of aggregation processing of the plurality of positioning frequency layers is related to one or more of the following: (i) positioning frequency layer aggregation type; (ii) number of positioning frequency layers to be aggregated; (iii) total bandwidth of positioning frequency layers to be aggregated; (iv) bandwidth of each DL of positioning frequency layers to be aggregated; (v) one or more of a channel spacing, a timing offset, a phase offset, a frequency error, and power imbalance between positioning frequency layers; (vi) whether to configure a measurement gap; (vii) frequency domain buffer capability type; and (viii) time domain buffer capability type.

(6) Whether beams (directions) of a plurality of positioning frequency layer are the same at a same moment (for example, an OFDM symbol).

(7) Whether a plurality of inter-band positioning frequency layers are the same at a same moment (for example, an OFDM symbol).

(8) Whether a plurality of intra-band discontinuous positioning frequency layers are the same at a same moment (for example, an OFDM symbol).

In some implementations, the types of the positioning frequency layers include:

(1) Intra-band continuous positioning frequency layers.

Further, the terminal capability further includes one or more of the following:

(i) supported number of continuous positioning frequency layers;

(ii) total maximum processing bandwidth;

(iii) maximum processing bandwidth of each positioning frequency layer; and (iv) maximum number of first reference signal resources that can be processed in one slot or symbol.

(2) Intra-band discontinuous positioning frequency layers.

Further, the terminal capability further includes one or more of the following:

(i) total maximum processing bandwidth;

(ii) supported maximum number of positioning frequency layers;

(iii) maximum processing bandwidth of each positioning frequency layer;

(iv) maximum number of first reference signal resources that can be processed in one slot or symbol;

(v) supported number of discontinuous positioning frequency layer groups;

(vi) maximum number of positioning frequency layers in each positioning frequency layer group;

(vii) maximum bandwidth of each positioning frequency layer group; and (viii) maximum number of first reference signal resources that can be processed in one slot or symbol.

(3) Inter-band discontinuous positioning frequency layers.

Further, the terminal capability further includes one or more of the following:

(i) maximum number of positioning frequency layers supported for processing;

(ii) supported maximum processing bandwidth;

(iii) maximum processing bandwidth of each positioning frequency layer;

(iv) maximum number of first reference signal resources that can be processed in one slot or symbol;

(v) number of bands supported for processing;

(vi) maximum processing bandwidth of each band;

(vii) maximum number of positioning frequency layers in each band;

(viii) maximum number of first reference signal resources that can be processed in one slot or symbol;

(ix) number of discontinuous positioning frequency layer groups supported in each band;

(x) maximum number of positioning frequency layers in each positioning frequency layer group;

(xi) maximum bandwidth of each positioning frequency layer group;

(xii) maximum number of first reference signal resources that can be processed in one slot or symbol;

(xiii) maximum number of first reference signal resources that can be processed in each slot; and (xiv) maximum number of first reference signal resources that can be processed in each symbol.

In some implementations, in a case that the terminal supports simultaneous measurement of the plurality of positioning frequency layers and/or supports simultaneous aggregation processing of the plurality of positioning frequency layers, the terminal capability further includes one or more of the following:

(1) a frequency domain buffer capability;

(2) a capability for separately processing one positioning frequency layer; and (3) a capability for performing aggregation processing on the plurality of positioning frequency layers.

In the embodiments of the present application, the terminal may simultaneously process first reference signal resources of one or more positioning frequency layers, which increases a valid bandwidth of the first reference signal, and improves the positioning precision of the terminal.

Referring to FIG. 3, an embodiment of the present application provides a reference signal resource processing method. The method may be executed by a network side device, and a specific step includes: step 301.

Step 301: Configure such that a terminal simultaneously processes first reference signal resources of one or more positioning frequency layers, where a first reference signal is used for positioning of the terminal.

In this embodiment of the present application, the network side device may send configuration information of the first reference signals to the terminal, where the configuration information instructs the terminal to simultaneously process the first reference signal resources of the one or more positioning frequency layers.

In this embodiment of the present application, the network side device may include: a location server and/or a serving gNB.

Signaling between the location server and the UE includes, but is not limited to one or more of the following: LPP signaling, new radio positioning protocol (NRPP) signaling, a combination of NR positioning protocol A (NRPPa) signaling and signaling between a gNB and UE, and a combination of LTE positioning protocol A (LPPa) signaling and signaling between a gNB and UE.

Signaling between a gNB and UE includes, but is not limited to one or more of the following: radio resource control (RRC), a media access control control element (MAC CE), downlink control information (DCI), a message 1 (Msg1), a message 3 (Msg3), broadcast signaling, a paging message (Paging), and a physical uplink control channel (PUCCH).

In this embodiment of the present application, the configuration information includes: information of a positioning frequency layer group, and the positioning frequency layer group includes: a plurality of positioning frequency layers simultaneously sent; or the configuration information includes: information of a positioning frequency layer, and the positioning frequency layer includes: a plurality of channel bandwidth parts.

In this embodiment of the application, the method further includes: sending first information, where the first information indicates one or more of the following:

(1) a reference positioning frequency layer of the plurality of positioning frequency layers;

(2) at least one resource set of each TRP at the reference positioning frequency layer is a reference resource set; and (3) at least one resource of each TRP at the reference positioning frequency layer is a reference resource.

In this embodiment of the present application, the method further includes:

receiving second information, where the second information indicates one or more of the following:

(1) a priority of the positioning frequency layer group;

(2) a priority of a positioning frequency layer in the positioning frequency layer group;

(3) a priority of a TRP corresponding to the positioning frequency layer group; and (4) a priority of measurement and/or aggregation processing on a measurement object.

In this embodiment of the application, the method further includes: receiving third information, where the third information includes one or more of the following:

(1) an aggregation instruction, where the aggregation instruction is used to instruct to perform aggregation processing on all or some of the plurality of positioning frequency layers;

(2) specific system frame number offsets (for example, SFN0) that exist when different positioning frequency layers of a same TRP send the first reference signals;

(3) a band indicator of the positioning frequency layer;

(4) a positioning frequency layer processing indication, indicating a positioning frequency layer received and/or processed by a same module;

(5) a positioning frequency layer aggregation relationship indication;

(6) one or more of a phase offset, a power offset, a frequency offset, and a frequency error between different positioning frequency layers of a same TRP; and (7) a QCL relationship between first reference signal resources of different positioning frequency layers of a same TRP.

In this embodiment of the present application, the method further includes: sending a measurement gap configuration, where the measurement gap configuration is used to simultaneously measure the first reference signals of the one or more positioning frequency layers.

In this embodiment of the present application, the method further includes: receiving a first request, where the first request is used to request the network side device to configure a measurement gap, and the first request includes one or more of the following:

(1) a measurement gap request indication;

(2) frequency information of the plurality of positioning frequency layers;

(3) a simultaneous processing indication;

(4) a measurement gap type indication;

(5) a measurement gap period;

(6) a measurement gap period offset; and (7) positioning frequency layer identifier information;

where the measurement gap is used to simultaneously process the first reference signal resources of the one or more positioning frequency layers.

In this embodiment of the present application, the method further includes: sending a second request to the network side device, where the second request is used to request the network side device to configure a plurality of measurement gaps, and the second request includes one or more of the following:

(1) a simultaneous processing indication;

(2) a measurement gap type indication;

(3) frequency information corresponding to the plurality of positioning frequency layers;

(4) a measurement gap period;

(5) a measurement gap period offset; and (6) a measurement gap length; and (7) number of measurement gaps;

where the plurality of measurement gaps are used to simultaneously process the first reference signal resources of the plurality of positioning frequency layers separately.

In this embodiment of the present application, the method further includes: receiving a measurement result of aggregation processing and/or a measurement result of non-aggregation processing.

In this embodiment of the present application, the method further includes:

receiving a terminal capability of the terminal, where the terminal capability includes one or more of the following:

whether to support simultaneous measurement of the first reference signal resources of the plurality of positioning frequency layers;

whether to support simultaneous aggregation processing of the first reference signal resources of the plurality of positioning frequency layers;

whether to support measurement of the first reference signal resources of the plurality of positioning frequency layers in one measurement gap;

whether to support simultaneous measurement of the first reference signal resources of the plurality of positioning frequency layers in a plurality of measurement gaps separately;

whether to support measurement of the first reference signal resources of the plurality of frequency layers without using a measurement gap;

whether to support aggregation processing of first reference signal resources that are discontinuous in frequency domain at one positioning frequency layer; and a number of positioning frequency layer groups supported by the terminal.

In the embodiments of the present application, the terminal may simultaneously process first reference signal resources of one or more positioning frequency layers, which increases a valid bandwidth of the first reference signal, and improves the positioning precision of the terminal.

The following describes the embodiments of the present application in combination with example 1 and example 2.

Example 1

This embodiment provides a solution in which although different positioning frequency layers include a same TRP, TRP IDs are different.

The network indicates a plurality of positioning frequency layers, and the plurality of positioning frequency layers include a same TRP, but TRP IDs are different.

In a TRP configuration of a positioning frequency layer, the network indicates a TRP ID of the TRP, and indicates another TRP ID (associated TRP ID) associated with the TRP, to indicate that the two TRP IDs correspond to a same TRP.

After receiving an 'associated TRP ID' associated with a TRP, the UE considers that two positioning frequency layers correspond to the same TRP, or that two TRP IDs actually correspond to different positioning frequency layers of the same TRP.

In addition, parameters of the TRP corresponding to the 'associated TRP ID' may also be reused as some parameters corresponding to TRPs of other positioning frequency layers, to reduce overheads.

Further, the protocol specifies or the network indicates: at a same moment, the UE performs aggregation processing on first reference signals sent by TRPs with a same associated TRP ID at different positioning frequency layers.

Example 2

Each frequency layer includes a same TRP, but in each frequency layer, TRP IDs are different. In this case, the network side configures the TRP ID of the same TRP as a 'reference TRP ID' (or associated TRP ID). The reference TRP ID is configured in a parameter of the same TRP (but with a different TRP ID) of another frequency layer, to indicate that the TRPs corresponding to the plurality of TRP IDs are the same.

In addition, parameters of the TRP corresponding to the 'reference TRP ID' may also be reused as some parameters corresponding to TRPs of other positioning frequency layers, to reduce overheads.

After receiving the indication, the UE aggregates the first reference signal resources (or first reference signal resource sets) of different positioning frequency layers of the same TRP.

Figures 4, 5:
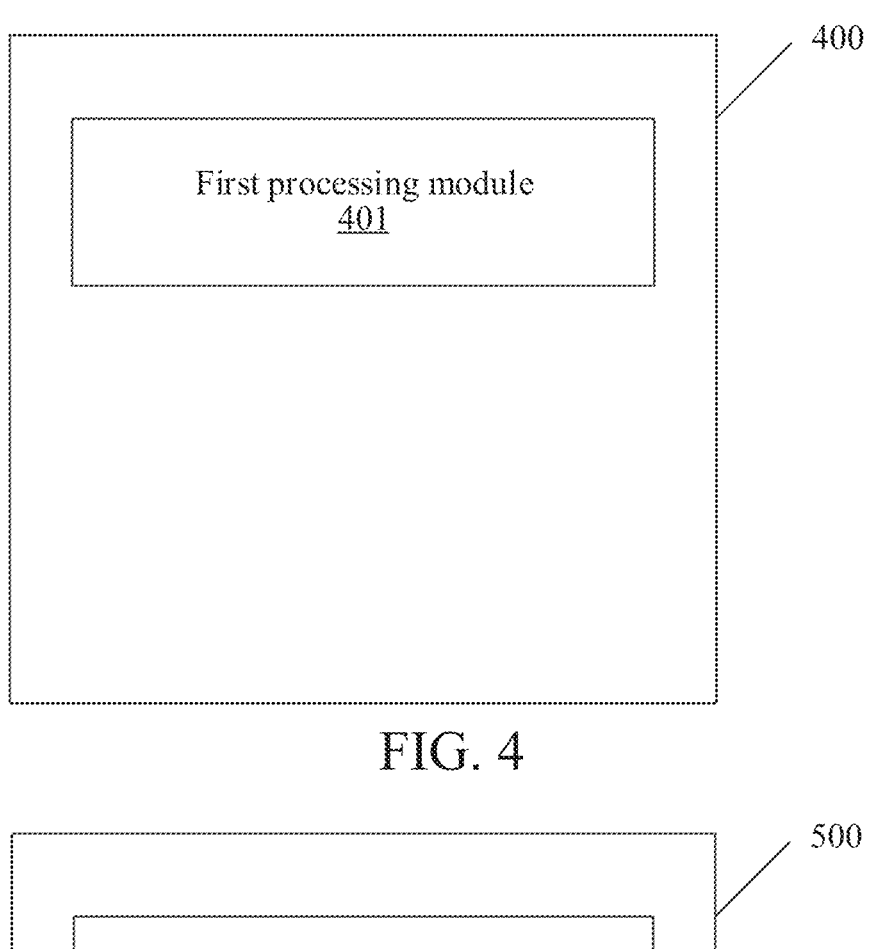
FIG. 4 is a schematic diagram 1 of a reference signal resource processing apparatus according to an embodiment of the present application.
FIG. 5 is a schematic diagram 2 of a reference signal resource processing apparatus according to an embodiment of the present application.

Referring to FIG. 4, an embodiment of the present application provides a reference signal resource processing apparatus, applied to a terminal. The apparatus 400 includes:

a first processing module 401, configured to simultaneously process first reference signal resources of one or more positioning frequency layers according to agreement in a protocol or configuration on a network side or selection on a terminal.

In this embodiment of the present application, the first processing module 401 is further configured to: simultaneously process the first reference signal resources of the one or more positioning frequency layers according to configuration information of the first reference signal.

In this embodiment of the present application, the configuration information includes: information of a positioning frequency layer group, and the positioning frequency layer group includes: a plurality of positioning frequency layers simultaneously sent.

The first processing module 401 is further configured to: perform aggregation processing or non-aggregation processing on first reference signal resources of the plurality of positioning frequency layers in the positioning frequency layer group according to the information of the positioning frequency layer group.

In this embodiment of the present application, the configuration information includes: information of the positioning frequency layer, and the positioning frequency layer includes: a plurality of channel bandwidth parts.

The first processing module 401 is further configured to: perform aggregation processing or non-aggregation processing on the first reference signal resources of the plurality of channel bandwidth parts of the positioning frequency layer according to the information of the positioning frequency layer.

In this embodiment of the present application, the information of the positioning frequency layer group includes an aggregation instruction, where the aggregation instruction is used to instruct to perform aggregation processing on the first reference signal resources of the plurality of positioning frequency layers in the positioning frequency layer group.

In this embodiment of the present application, the information of the positioning frequency layer group includes: information of the plurality of positioning frequency layers, information of at least some positioning frequency layers includes: an aggregation instruction, where the aggregation instruction is used to instruct to perform aggregation processing on the first reference signal resources of the at least some positioning frequency layers.

In this embodiment of the present application, the information of the positioning frequency layer group includes: information of a TRP, the information of the TRP includes: an aggregation instruction, where the aggregation instruction is used to instruct to perform aggregation processing on first reference signal resources of at least some positioning frequency layers of the TRP.

In this embodiment of the present application, features of the plurality of positioning frequency layers include one or more of the following:

(1) subcarrier spacings of the first reference signals are the same;

(2) comb sizes of the first reference signal are the same;

(3) products of subcarrier spacings of the first reference signals and comb sizes of the first reference signals are the same;

(4) cyclic prefix types are the same;

(5) specific reference points (for example, reference points A) are the same; and (6) corresponding TRP lists are the same.

In this embodiment of the present application, at a same moment, in a same TRP, features of a plurality of first reference signal resources located at the plurality of positioning frequency layers include one or more of the following:

(1) associated spatial transfer filters are the same;

(2) sequence identifiers are the same;

(3) resource element offsets are the same;

(4) numbers of symbols are the same;

(5) symbol offsets are the same;

(6) slot offsets are the same; and (7) transmit powers are the same.

In this embodiment of the present application, the plurality of first reference signal resources respectively belong to different first reference signal resource sets.

A feature of the first reference signal resource set includes one or more of the following:

(1) periods are the same;

(2) first reference signal resource set slot offsets are the same;

(3) repetition factors are the same;

(4) repetition gaps are the same;

(5) muting patterns are the same; and (6) numbers of resources are the same.

In an embodiment of the present application, the apparatus 400 further includes:

a first obtaining module, configured to obtain first information configured on the network side, where the first information indicates one or more of the following:

(1) a reference positioning frequency layer of the plurality of positioning frequency layers;

(2) at least one resource set of each TRP at the reference positioning frequency layer is a reference resource set; and (3) at least one resource of each TRP at the reference positioning frequency layer is a reference resource.

In this embodiment of the present application, the information of the positioning frequency layer group further includes one or more of the following: an identifier of the positioning frequency layer group; and identifiers of the plurality of positioning frequency layers.

In this embodiment of the present application, the method further includes: receiving second information, where the second information indicates one or more of the following:

(1) a priority of the positioning frequency layer group;

(2) a priority of a positioning frequency layer in the positioning frequency layer group;

(3) a priority of a TRP corresponding to the positioning frequency layer group; and (4) a priority of measurement and/or aggregation processing on a measurement object.

In this embodiment of the application, the method further includes: receiving third information, where the third information includes one or more of the following:

(1) an aggregation instruction, where the aggregation instruction is used to instruct to perform aggregation processing on all or some of the plurality of positioning frequency layers;

(2) timing offsets in a case that different positioning frequency layers of a same TRP send the first reference signals;

(3) a band indicator of the positioning frequency layer;

(4) a positioning frequency layer processing indication, indicating a positioning frequency layer received and/or processed by a same module;

(5) a positioning frequency layer aggregation relationship indication;

(6) one or more of a phase offset, a power offset, a frequency offset, and a frequency error between different positioning frequency layers of a same TRP; and (7) a quasi co-location relationship between first reference signal resources of different positioning frequency layers of a same TRP.

In this embodiment of the present application, the positioning frequency layer aggregation relationship indication includes an indication of a relationship between positioning frequency layers that are adjacent in frequency domain, and the relationship includes one or more of the following:

(1) intra-band continuous carrier aggregation;

(2) intra-band discontinuous carrier aggregation; and (3) on a same carrier. In this embodiment of the present application, a plurality of positioning frequency layers in each TRP correspond to the same third information.

In an embodiment of the present application, the apparatus 400 further includes:

a first receiving module, configured to receive fourth information, where the fourth information instructs to simultaneously update at least some parameters of first reference signal resources of positioning frequency layers of one or more TRPs.

In an embodiment of the present application, the apparatus 400 further includes:

a second processing module, configured to receive first reference signal resources of a plurality of positioning frequency layers of a same TRP at a same moment; and in a case that a preset condition is met, expect, by the terminal, to perform aggregation processing on the first reference signal resources of the plurality of positioning frequency layers;

where the preset condition includes one or more of the following:

(1) the plurality of positioning frequency layers belong to a same positioning frequency layer group, or the plurality of positioning frequency layers belong to one positioning frequency domain layer group, and information of the positioning frequency domain layer group includes an aggregation instruction;

(2) information of the plurality of positioning frequency layers includes an aggregation instruction; and (3) the first reference signal resources of the plurality of positioning frequency layers satisfy a preset feature.

In this embodiment of the present application, the preset feature includes one or more of the following:

(1) the first reference signals of the plurality of positioning frequency layers are sent from a same spatial filter;

(2) timing offsets time offsets (for example, SFN0) of the first reference signals of the plurality of positioning frequency layers are less than a first threshold;

(3) received power parameters of the first reference signals of the plurality of positioning frequency layers are less than a second threshold;

(4) a center frequency offset between different positioning frequency layers of the plurality of positioning frequency layers is less than a third threshold;

(5) a frequency domain channel spacing between different positioning frequency layers of the plurality of positioning frequency layers is less than a fourth threshold; and (6) a phase offset between different positioning frequency layers of the plurality of positioning frequency layers is less than a fifth threshold. In an embodiment of the present application, the apparatus 400 further includes:

a second receiving module, configured to: before simultaneously processing the first reference signals of the plurality of positioning frequency layers, receive a measurement gap configuration, where the measurement gap configuration is used to simultaneously measure the first reference signal resources of the one or more positioning frequency layers.

In this embodiment of the present application, the first processing module is further configured to: according to the measurement gap configuration, simultaneously process the first reference signal resources of the one or more positioning frequency layers in one measurement gap; or according to the measurement gap configuration, separately process the first reference signal resources of the plurality of positioning frequency layers in a plurality of measurement gaps separately.

In this embodiment of the present application, in a case that the terminal simultaneously processes the first reference signal resources of the one or more positioning frequency layers in one measurement gap, the measurement gap configuration includes one or more of the following:

(1) a measurement gap length;

(2) a measurement gap period;

(3) a measurement gap timing advance;

(4) a plurality of pieces of frequency information associated with the measurement gap;

(5) a plurality of pieces of positioning frequency layer identifier information associated with the measurement gap; and (6) a measurement gap type indication.

In an embodiment of the present application, the apparatus 400 further includes:

a first sending module, configured to send a first request to a network side device, where the first request is used to request the network side device to configure a measurement gap, and the first request includes one or more of the following:

(1) a measurement gap request indication;

(2) frequency information of the plurality of positioning frequency layers;

(3) a simultaneous processing indication;

(4) a measurement gap type indication;

(5) a measurement gap period;

(6) a measurement gap period offset; and (7) positioning frequency layer identifier information.

In this embodiment of the present application, the measurement gap is configured according to a request for each positioning frequency layer group.

In this embodiment of the present application, in a case that the terminal simultaneously processes the first reference signal resources of the plurality of positioning frequency layers according to the plurality of measurement gaps, the measurement gap configuration includes first configuration information, and the first configuration information includes one or more of the following:

(1) positioning frequency layer identifier information associated with the measurement gap; and (2) frequency information associated with the measurement gap.

In this embodiment of the present application, the measurement gap configuration further includes second configuration information, and the second configuration information includes one or more of the following:

(1) a measurement gap length;

(2) a measurement gap period;

(3) a measurement gap period offset; and (4) a measurement gap timing advance;

In this embodiment of the present application, the measurement gap configuration further includes: a measurement gap group, the measurement gap group includes a plurality of measurement gaps whose at least some features are the same, a common configuration of the measurement gap group includes the second configuration information, and an independent configuration of the measurement gap group includes the first configuration information.

In an embodiment of the present application, the apparatus 400 further includes:

a second sending module, configured to send a second request to the network side device, where the second request is used to request the network side device to configure a plurality of measurement gaps, and the second request includes one or more of the following:

(1) a simultaneous processing indication;

(2) a measurement gap type indication;

(3) frequency information corresponding to the plurality of positioning frequency layers;

(4) a measurement gap period;

(5) a measurement gap period offset;

(6) a measurement gap length; and (7) number of measurement gaps;

where the plurality of measurement gaps are used to simultaneously process the first reference signal resources of the plurality of positioning frequency layers separately.

In an embodiment of the present application, the apparatus 400 further includes:

a measurement module, configured to: after simultaneously processing the first reference signal resources of the one or more positioning frequency layers, measure the first reference signal resources of the plurality of positioning frequency layers and report a measurement result.

In this embodiment of the present application, the reporting a measurement result includes: reporting a measurement result of aggregation processing and/or a measurement result of non-aggregation processing.

In this embodiment of the present application, the measurement result of aggregation processing includes one or more of the following:

(1) indication information of the positioning frequency layers of aggregation processing;

(2) identifier information corresponding to the measurement result; and (3) whether to compensate one or more of a phase offset, a power offset, a frequency offset, and a frequency error.

In this embodiment of the present application, the measurement result of non-aggregation processing includes one or more of the following:

(1) a separate measurement result of each positioning frequency layer;

(2) a measurement result of a first path or phase information of each positioning frequency layer;

(3) a reason for non-aggregation processing; and (4) a measurement result of aggregation estimation of the plurality of positioning frequency layers.

In an embodiment of the present application, the apparatus 400 further includes:

a third sending module, configured to report a terminal capability of the terminal, where the terminal capability includes one or more of the following:

(1) whether to support simultaneous measurement of the first reference signal resources of the plurality of positioning frequency layers;

(2) whether to support simultaneous aggregation processing of the first reference signal resources of the plurality of positioning frequency layers;

(3) whether to support measurement of the first reference signal resources of the plurality of positioning frequency layers in one measurement gap;

(4) whether to support simultaneous measurement of the first reference signal resources of the plurality of positioning frequency layers in a plurality of measurement gaps separately;

(5) whether to support measurement of the first reference signal resources of the plurality of frequency layers without using a measurement gap;

(6) whether to support aggregation processing of first reference signal resources that are discontinuous in frequency domain at one positioning frequency layer; and (7) a number of positioning frequency layer groups supported by the terminal.

In this embodiment of the present application, in a case that the terminal supports simultaneous measurement of the plurality of positioning frequency layers and/or supports simultaneous aggregation processing of the plurality of positioning frequency layers, the terminal capability further includes one or more of the following:

(1) types of the plurality of positioning frequency layers on which simultaneous measurement and/or aggregation processing is performed;

(2) one or more of a maximum channel spacing, a timing offset, a phase offset, a frequency error, and power imbalance between positioning frequency layers on which simultaneous measurement and/or aggregation processing is performed;

(3) a frequency domain buffer capability type;

(4) a capability for separately processing one positioning frequency layer;

(5) a capability for performing aggregation processing on the plurality of positioning frequency layers;

(6) whether beams of a plurality of positioning frequency layer are the same at a same moment;

(7) whether a plurality of inter-band (Inter-band) positioning frequency layers are the same at a same moment; and (8) whether a plurality of intra-band (Intra-band) discontinuous positioning frequency layers are the same at a same moment.

In this embodiment of the present application, the types of the positioning frequency layers include:

(1) intra-band continuous positioning frequency layers;

(2) intra-band discontinuous positioning frequency layers; and (3) inter-band discontinuous positioning frequency layers.

In this embodiment of the present application, in a case that the terminal supports simultaneous measurement of the plurality of positioning frequency layers and/or supports simultaneous aggregation processing of the plurality of positioning frequency layers, the terminal capability further includes one or more of the following:

(1) a frequency domain buffer capability type;

(2) a capability for separately processing one positioning frequency layer; and (3) a capability for performing aggregation processing on the plurality of positioning frequency layers.

The apparatus provided by the embodiments of the present application can realize each process of the method embodiment of FIG. 2, and achieve the same technical effect. To avoid repetition, details are not described herein again.

Referring to FIG. 5, an embodiment of the present application provides a reference signal resource processing apparatus, applied to a network side device. The apparatus 500 includes:

a third processing module 501, configured to configure such that a terminal simultaneously processes first reference signal resources of one or more positioning frequency layers.

In this embodiment of the present application, the third processing module 501 is further configured to: send first reference signal frequency domain configuration information to the terminal, where the first reference signal frequency domain configuration information instructs the terminal to simultaneously process the first reference signal resources of the one or more positioning frequency layers.

In this embodiment of the present application, the first reference signal frequency domain configuration information includes: information of a positioning frequency layer group, and the positioning frequency layer group includes: a plurality of positioning frequency layers simultaneously sent; or the configuration information includes: information of a positioning frequency layer, and the positioning frequency layer includes: a plurality of channel bandwidth parts.

In an embodiment of the present application, the apparatus 500 further includes:

a fourth sending module, configured to send first information, where the first information indicates one or more of the following:

(1) a reference positioning frequency layer of the plurality of positioning frequency layers;

(2) at least one resource set of each TRP at the reference positioning frequency layer is a reference resource set; and (3) at least one resource of each TRP at the reference positioning frequency layer is a reference resource.

In an embodiment of the present application, the apparatus 500 further includes:

a third receiving module, configured to receive second information, and the second information indicates one or more of the following:

(1) a priority of the positioning frequency layer group;

(2) a priority of a positioning frequency layer in the positioning frequency layer group;

(3) a priority of a TRP corresponding to the positioning frequency layer group; and (4) a priority of measurement and/or aggregation processing on a measurement object.

In an embodiment of the present application, the apparatus 500 further includes:

a fourth receiving module, configured to receive third information, where the third information includes one or more of the following:

(1) an aggregation instruction, where the aggregation instruction is used to instruct to perform aggregation processing on all or some of the plurality of positioning frequency layers;

(2) timing offsets in a case that different positioning frequency layers of a same TRP send the first reference signals;

(3) a band indicator of the positioning frequency layer;

(4) a positioning frequency layer processing indication, indicating a positioning frequency layer received and/or processed by a same module;

(5) a positioning frequency layer aggregation relationship indication;

(6) one or more of a phase offset, a power offset, a frequency offset, and a frequency error between different positioning frequency layers of a same TRP; and (7) a quasi co-location relationship between first reference signal resources of different positioning frequency layers of a same TRP.

In an embodiment of the present application, the apparatus 500 further includes:

a fifth sending module, configured to send a measurement gap configuration, where the measurement gap configuration is used to simultaneously measure the first reference signals of the one or more positioning frequency layers.

In an embodiment of the present application, the apparatus 500 further includes:

a fifth receiving module, configured to receive a first request, where the first request is used to request the network side device to configure a measurement gap, and the first request includes one or more of the following:

(1) a measurement gap request indication;

(2) frequency information of the plurality of positioning frequency layers;

(3) a simultaneous processing indication;

(4) a measurement gap type indication;

(5) a measurement gap period;

(6) a measurement gap period offset; and (7) positioning frequency layer identifier information;

where the measurement gap is used to simultaneously process the first reference signal resources of the one or more positioning frequency layers.

In an embodiment of the present application, the apparatus 500 further includes:

a sixth sending module, configured to send a second request to the network side device, where the second request is used to request the network side device to configure a plurality of measurement gaps, and the second request includes one or more of the following:

(1) a simultaneous processing indication;

(2) a measurement gap type indication;

(3) frequency information corresponding to the plurality of positioning frequency layers;

(4) a measurement gap period;

(5) a measurement gap period offset;

(6) a measurement gap length; and (7) number of measurement gaps;

where the plurality of measurement gaps are used to simultaneously process the first reference signal resources of the plurality of positioning frequency layers separately.

In an embodiment of the present application, the apparatus 500 further includes:

a sixth receiving module, configured to receive a measurement result of aggregation processing and/or a measurement result of non-aggregation processing.

In an embodiment of the present application, the apparatus 500 further includes:

a seventh receiving module, configured to receive a terminal capability of the terminal, where the terminal capability includes one or more of the following:

(1) whether to support simultaneous measurement of the first reference signal resources of the plurality of positioning frequency layers;

(2) whether to support simultaneous aggregation processing of the first reference signal resources of the plurality of positioning frequency layers;

(3) whether to support measurement of the first reference signal resources of the plurality of positioning frequency layers in one measurement gap;

(4) whether to support simultaneous measurement of the first reference signal resources of the plurality of positioning frequency layers in a plurality of measurement gaps separately;

(5) whether to support measurement of the first reference signal resources of the plurality of frequency layers without using a measurement gap;

(6) whether to support aggregation processing of first reference signal resources that are discontinuous in frequency domain at one positioning frequency layer, and (7) a number of positioning frequency layer groups supported by the terminal.

The apparatus provided by the embodiments of the present application can realize each process of the method embodiment of FIG. 4, and achieve the same technical effect. To avoid repetition, details are not described herein again.

Figure 6:
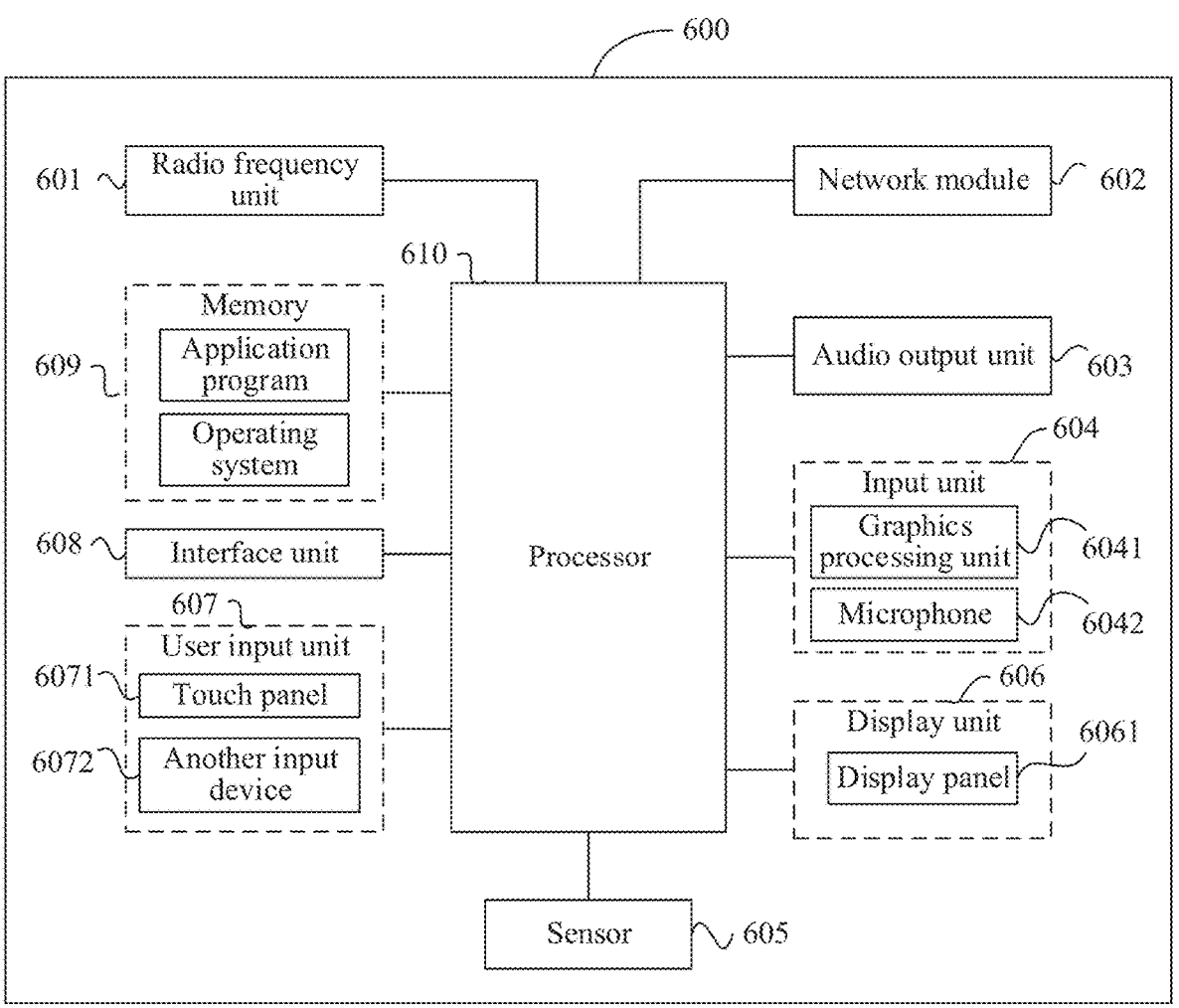
FIG. 6 is a schematic diagram of a terminal according to an embodiment of the present application.

FIG. 6 is a schematic diagram of a hardware structure of a terminal according to an embodiment of the present application.

The terminal 600 includes, but is not limited to, components such as a radio frequency unit 601, a network module 602, an audio output unit 603, an input unit 604, a sensor 605, a display unit 606, a user input unit 607, an interface unit 608, a memory 609, and a processor 610.

Those skilled in the art can understand that the terminal 600 may further include the power supply (such as a battery) supplying power to each component. The power supply may be logically connected to the processor 610 by using a power management system, so as to implement functions such as charging management, discharging management and power consumption management by using the power management system. The structure of the terminal shown in FIG. 6 does not constitute a limitation to the terminal. The terminal may include more or fewer components than that shown in the figure, or a combination of some components, or an arrangement of different components. Details are not described herein again.

It should be understood that in this embodiment of the present application, the input unit 604 may include a Graphics Processing Unit (GPU) 6041 and a microphone 6042, and the graphics processing unit 6041 processes image data of a still picture or a video obtained by an image capture apparatus (such as a camera) in a video capture mode or an image capture mode. The display unit 606 may include a display panel 6061, and the display panel 6061 may be configured in the form of a liquid crystal display, an organic light-emitting diode, and the like. The user input unit 607 includes a touch panel 6071 and another input device 6072.

The touch panel 6071 is also called a touch screen. The touch panel 6071 may include two parts: a touch detection apparatus and a touch controller. The another input device 6072 may include but is not limited to: a physical keyboard, a function key (such as a volume control key or a switch key), a trackball, a mouse, and a joystick, which is no longer repeated herein.

In this embodiment of the present application, the radio frequency unit 601 receives downlink data from a network side device, and transmits the downlink data to the processor 610 for processing; and in addition, transmits uplink data to the network side device. Generally, the radio frequency unit 601 includes but is not limited to an antenna, at least one amplifier, a transceiver, a coupler, a low noise amplifier, a duplexer, and the like.

The memory 609 may be configured to store a software program as well as various types of data. The memory 609 may mainly include a program storage area and a data storage area. The program storage area may store an operating system, an application program or instruction required by at least one function (such as a sound playback function and an image playback function), and the like. In addition, the memory 609 may include a high-speed random access memory and a nonvolatile memory. The nonvolatile memory may be a Read-only Memory (ROM), a Programmable ROM (PROM), an Erasable PROM (EPROM), an Electrically EPROM (EEPROM), or a flash memory, for example, at least one magnetic disk storage device, a flash memory device, or another nonvolatile solid-state storage device.

The processor 610 may include one or more processing units. In some embodiments, the processor 610 may integrate an application processor and a modem processor. The application processor mainly deals with an operating system, a user interface, an application program or instruction, and the like. The modem processor mainly deals with wireless communication, such as a baseband processor. It can be understood that, in some embodiments, the modem processor may not be integrated into the processor 610.

The terminal provided by the embodiments of the present application can realize each process of the method embodiment of FIG. 2, and achieve the same technical effect. To avoid repetition, details are not described herein again.

Figure 7:
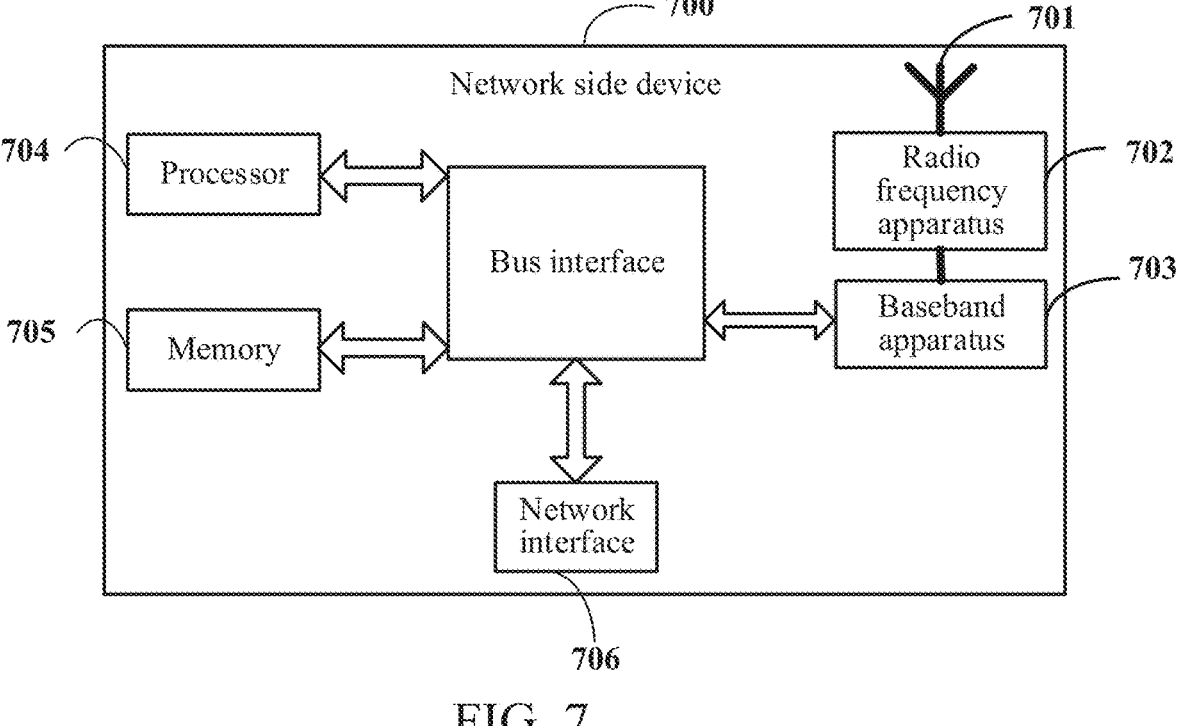
FIG. 7 is a schematic diagram of a network side device according to an embodiment of the present application.

An embodiment of the present application further provides a network side device. As shown in FIG. 7, the network side device 700 includes an antenna 701, a radio frequency apparatus 702, and a baseband apparatus 703. The antenna 701 is connected to the radio frequency apparatus 702. In an uplink direction, the radio frequency apparatus 702 receives information through the antenna 701, and sends the received information to the baseband apparatus 703 for processing. In a downlink direction, the baseband apparatus 703 processes information to be sent and sends the information to the radio frequency apparatus 702, and the radio frequency apparatus 702 processes the received information and then sends the information through the antenna 701.

The band processing apparatus may be located in the baseband apparatus 703, and the method performed by the network side device in the foregoing embodiment may be implemented in the baseband apparatus 703. The baseband apparatus 703 includes a processor 704 and a memory 705.

The baseband apparatus 703 may include, for example, at least one baseband board, and a plurality of chips are arranged on the baseband board. As shown in FIG. 7, one of the chips is, for example, the processor 704, which is connected to the memory 705, to invoke a program in the memory 705, so as to perform the operations of the network device shown in the foregoing method embodiment.

The baseband apparatus 703 may further include a network interface 706, configured to exchange information with the radio frequency apparatus 702. For example, the interface is a common public radio interface (CPRI).

The network side device in this embodiment of the present application further includes programs or instructions stored in the memory 705 and executable on the processor 704, and the processor 704 invokes the programs or instructions in the memory 705 to perform the method performed by the modules shown in FIG. 5, and achieve the same technical effect. In order to avoid repetition, details are not described herein again.

An embodiment of the present application further provides a program product, stored in a nonvolatile storage medium. The program product is executed by at least one processor to implement the steps in the foregoing processing method in FIG. 3.

An embodiment of the present application further provides a readable storage medium. The readable storage medium stores programs or instructions. When the programs or instructions are executed by a processor, each process of the foregoing method embodiment in FIG. 2 or FIG. 3 is implemented, and a same technical effect can be achieved. To avoid repetition, details are not described herein again.

The processor is the processor in the terminal described in the above embodiment. The readable storage medium includes a computer-readable storage medium, such as a computer Read-Only Memory (ROM), a Random Access Memory (RAM), a magnetic disk or an optical disk.

An embodiment of the present application further provides a chip, including a processor and a communication interface, where the communication interface is coupled to the processor, and the processor is configured to run programs or instructions of a network side device, to implement each process of the foregoing method embodiment in FIG. 2 and achieve a same technical effect. To avoid repetition, details are not described herein again.

It should be understood that the chip mentioned in this embodiment of the present application may also be referred to as a system-level chip, a system chip, a chip system, a system on chip, or the like.

It should be noted that the terms "include", "comprise", or any other variants thereof in this specification are intended to cover a non-exclusive inclusion, so that a process, method, object, or apparatus including a series of elements not only includes those elements, but also includes other elements which are not clearly listed, or includes inherent elements of the process, method, object, or apparatus. Without more limitations, elements defined by the sentence "including one" does not exclude that there are still other same elements in the process, method, object, or apparatus which includes the element. In addition, it should be noted that the scope of the methods and apparatuses in the implementations of the present application is not limited to performing functions in an order shown or discussed, but may further include performing functions in a basically simultaneous manner or a converse order according to the involved functions. For example, the described methods may be performed in an order different from the described order, and various steps may be added, omitted, or combined. In addition, features described with reference to some examples may be combined in other examples.

Through the descriptions of the foregoing implementations, a person skilled in the art may clearly understand that the methods in the foregoing embodiments may be implemented by means of software and a necessary general hardware platform, and may also be implemented by hardware, but in many cases, the former manner is a better implementation. Based on such an understanding, the technical solutions of the present application essentially or the part contributing to the prior art may be embodied in a form of a software product. The computer software product is stored in a storage medium (such as a ROM/RAM, a magnetic disk, or an optical disc) and includes several instructions to enable a terminal (which may be a mobile phone, a computer, a server, a network device, or the like) to perform the methods described in the embodiments of the present application.

The embodiments of the present application are described above with reference to the accompanying drawings. However, the present application is not limited to the foregoing specific implementations. The foregoing specific implementations are only exemplary and not limitative. Enlightened by the present application, a person of ordinary skill in the art may further make many variations without departing from the idea of the present application and the protection scope of the claims. All of the variations fall within the protection scope of the present application.

What is claimed is:

1. A method for reference signal resource processing, performed by a terminal, comprising:

receiving a measurement gap configuration; and simultaneously processing first reference signal resources of multiple positioning frequency layers according to a configuration on a network side, wherein each first reference signal is used for positioning the terminal, wherein the first reference signal resources are discontinuous in a frequency domain, wherein the simultaneously processing first reference signal resources of multiple positioning frequency layers according to a configuration on a network side comprises:

according to the measurement gap configuration, simultaneously processing the first reference signal resources of the multiple positioning frequency layers in one measurement gap; or simultaneously processing the first reference signal resources of the multiple positioning frequency layers according to configuration information of the first reference signal, wherein:

the configuration information comprises information of a positioning frequency layer group, and processing the first reference signal resources of the multiple positioning frequency layers according to the configuration information comprises: performing aggregation processing on the first reference signal resources of the multiple positioning frequency layers in the positioning frequency layer group according to the information of the positioning frequency layer group.

2. The method according to claim 1, wherein the configuration information further comprises: information of each positioning frequency layer, and the positioning frequency layer comprises: a plurality of channel bandwidth parts, wherein processing the first reference signal resources of the multiple positioning frequency layers according to configuration information further comprises:

performing aggregation processing or non-aggregation processing on the first reference signal resources of the plurality of channel bandwidth parts of the multiple positioning frequency layers according to the information of the multiple positioning frequency layers.

3. The method according to claim 1, wherein the positioning frequency layer group comprises a plurality of positioning frequency layers simultaneously sending their respective first reference signal resources.

4. The method according to claim 3, wherein the information of the positioning frequency layer group comprises an aggregation instruction, and the aggregation instruction is used to instruct to perform the aggregation processing on the first reference signal resources of the plurality of positioning frequency layers in the positioning frequency layer group;

wherein the information of the positioning frequency layer group comprises: information of the plurality of positioning frequency layers, and information of at least some positioning frequency layers comprises: an aggregation instruction, wherein the aggregation instruction is used to instruct to perform the aggregation processing on the first reference signal resources of the at least some positioning frequency layers;

wherein the information of the positioning frequency layer group comprises: information of a transmission reception point (TRP), and the information of the TRP comprises: an aggregation instruction, wherein the aggregation instruction is used to instruct to perform the aggregation processing on first reference signal resources of at least some positioning frequency layers of the TRP;

wherein the information of the positioning frequency layer group further comprises one or more of the following: an identifier of the positioning frequency layer group or identifiers of the plurality of positioning frequency layers; or wherein the method further comprises receiving second information, and the second information indicates one or more of the following:

a priority of the positioning frequency layer group;

a priority of a positioning frequency layer in the positioning frequency layer group;

a priority of a TRP corresponding to the positioning frequency layer group; or a priority of measurement or aggregation processing on a measurement object.

5. The method according to claim 1, wherein features of the multiple positioning frequency layers comprise one or more of the following:

subcarrier spacings of the first reference signals are the same;

comb sizes comb sizes of the first reference signals are the same;

products of subcarrier spacings of the first reference signal and a PRS comb size are the same;

cyclic prefix types are the same;

specific reference points are the same; or corresponding TRP lists are the same, wherein features of a plurality of first reference signal resources located at the multiple positioning frequency layers comprise one or more of the following:

associated spatial transfer filters are the same;

sequence identifiers are the same;

resource element offsets are the same;

numbers of symbols are the same;

symbol offsets are the same;

slot offsets are the same;

transmit powers are the same;

periods are the same;

PRS resource set slot offsets are the same;

repetition factors are the same;

repetition gaps are the same; or muting patterns are the same.

6. The method according to claim 1, further comprising:

obtaining first information configured on the network side, wherein the first information indicates one or more of the following:

a reference positioning frequency layer of the multiple positioning frequency layers;

at least one resource set of each TRP at the reference positioning frequency layer is a reference resource set; or at least one resource of each TRP at the reference positioning frequency layer is a reference resource.

7. The method according to claim 1, further comprising:

receiving third information, wherein the third information comprises one or more of the following:

an aggregation instruction, wherein the aggregation instruction is used to instruct to perform aggregation processing on all or some of the multiple positioning frequency layers;

timing offsets when different positioning frequency layers of a same TRP send the first reference signals;

a band indicator of the positioning frequency layer;

a positioning frequency layer processing indication, indicating at least two positioning frequency layers received or processed by a same module;

a positioning frequency layer aggregation relationship indication;

one or more of a phase offset, a power offset, a frequency offset, and a frequency error between different positioning frequency layers of a same TRP; or a quasi co-location relationship between first reference signal resources of different positioning frequency layers of a same TRP, wherein the positioning frequency layer aggregation relationship indication comprises an indication of a relationship between positioning frequency layers that are adjacent in frequency domain, and the relationship comprises one or more of the following:

intra-band continuous carrier aggregation;

intra-band discontinuous carrier aggregation; or on a same carrier, wherein a plurality of positioning frequency layers in each TRP correspond to the same third information.

8. The method according to claim 1, further comprising:

receiving fourth information, wherein the fourth information instructs to simultaneously update at least some parameters of first reference signal resources of positioning frequency layers of one or more TRPs.

9. The method according to claim 1, further comprising:

receiving first reference signal resources of a plurality of positioning frequency layers of a same TRP at a same moment; and when a preset condition is met, expecting, by the terminal, to perform aggregation processing on the first reference signal resources of the plurality of positioning frequency layers, wherein the preset condition comprises one or more of the following:

the plurality of positioning frequency layers belong to a same positioning frequency layer group, or the plurality of positioning frequency layers belong to one positioning frequency domain layer group, and information of the positioning frequency domain layer group comprises an aggregation instruction;

information of the plurality of positioning frequency layers comprises an aggregation instruction; or the first reference signal resources of the plurality of positioning frequency layers satisfy a preset feature, wherein the preset feature comprises one or more of the following:

the first reference signals of the plurality of positioning frequency layers are sent from a same spatial filter;

timing offsets of the first reference signals of the plurality of positioning frequency layers are less than a first threshold;

received power parameters of the first reference signals of the plurality of positioning frequency layers are less than a second threshold;

a center frequency offset between different positioning frequency layers of the plurality of positioning frequency layers is less than a third threshold;

a frequency domain channel spacing between different positioning frequency layers of the plurality of positioning frequency layers is less than a fourth threshold; or a phase offset between different positioning frequency layers of the plurality of positioning frequency layers is less than a fifth threshold.

10. The method according to claim 1, wherein the simultaneously processing first reference signal resources of multiple positioning frequency layers according to a configuration on a network side further comprises:

according to the measurement gap configuration, simultaneously processing the first reference signal resources of the multiple positioning frequency layers in a plurality of measurement gaps, wherein when the terminal simultaneously processes the first reference signal resources of the multiple positioning frequency layers in one measurement gap, the measurement gap configuration comprises one or more of the following:

a measurement gap length;

a measurement gap period;

a measurement gap timing advance;

a plurality of pieces of frequency information associated with the measurement gap;

a plurality of pieces of positioning frequency layer identifier information associated with the measurement gap; or a measurement gap type indication.

11. The method according to claim 10, further comprising:

sending a first request to a network side device, wherein the first request is used to request the network side device to configure a measurement gap, and the first request comprises one or more of the following:

a measurement gap request indication;

frequency information of the multiple positioning frequency layers;

a simultaneous processing indication;

a measurement gap type indication;

a measurement gap period;

a measurement gap period offset; or positioning frequency layer identifier information, wherein the measurement gap is configured according to a request for each positioning frequency layer group.

12. The method according to claim 10, wherein when the terminal simultaneously processes the first reference signal resources of the multiple positioning frequency layers according to the plurality of measurement gaps, the measurement gap configuration comprises first configuration information, and the first configuration information comprises one or more of the following:

positioning frequency layer identifier information associated with the measurement gap; or frequency information associated with the measurement gap, wherein the measurement gap configuration further comprises second configuration information, and the second configuration information comprises one or more of the following:

a measurement gap length;

a measurement gap period;

a measurement gap period offset; and a measurement gap timing advance, wherein the measurement gap configuration further comprises a measurement gap group having a plurality of measurement gaps with at least partially the same features, a common configuration of the measurement gap group comprises the second configuration information, and an independent configuration of the measurement gap group comprises the first configuration information.

13. The method according to claim 12, further comprising:

sending a second request to a network side device, wherein the second request is used to request the network side device to configure a plurality of measurement gaps, and the second request comprises one or more of the following:

a simultaneous processing indication;

a measurement gap type indication;

frequency information corresponding to the multiple positioning frequency layers;

a measurement gap period;

a measurement gap period offset;

a measurement gap length; or a number of measurement gaps, wherein the plurality of measurement gaps are used to simultaneously process the first reference signal resources of the multiple positioning frequency layers separately.

14. The method according to claim 1, further comprising:

after simultaneously processing the first reference signal resources of the multiple positioning frequency layers, measuring the first reference signal resources of the multiple positioning frequency layers and reporting a measurement result, wherein reporting the measurement result comprises reporting a measurement result of aggregation processing or a measurement result of non-aggregation processing, wherein the measurement result of aggregation processing comprises one or more of the following:

indication information of the multiple positioning frequency layers of aggregation processing;

identifier information corresponding to the measurement result; or whether to compensate one or more of a phase offset, a power offset, a frequency offset, or a frequency error, wherein the measurement result of non-aggregation processing comprises one or more of the following:

a separate measurement result of each positioning frequency layer;

a measurement result of a first path or phase information of each positioning frequency layer;

a reason for non-aggregation processing; or a measurement result of aggregation estimation of the multiple positioning frequency layers.

15. The method according to claim 1, further comprising reporting a terminal capability of the terminal, wherein the terminal capability comprises one or more of the following:

whether to support simultaneous measurement of the first reference signal resources of the multiple positioning frequency layers;

whether to support simultaneous aggregation processing of the first reference signal resources of the multiple positioning frequency layers;

whether to support measurement of the first reference signal resources of the multiple positioning frequency layers in one measurement gap;

whether to support simultaneous measurement of the first reference signal resources of the multiple positioning frequency layers in a plurality of measurement gaps separately;

whether to support measurement of the first reference signal resources of a plurality of frequency layers without using a measurement gap;

whether to support aggregation processing of first reference signal resources that are discontinuous in frequency domain at one positioning frequency layer; or a number of positioning frequency layer groups supported by the terminal, wherein when the terminal supports simultaneous measurement of the multiple positioning frequency layers or supports simultaneous aggregation processing of the multiple positioning frequency layers, the terminal capability further comprises one or more of the following:

types of the multiple positioning frequency layers on which simultaneous measurement or aggregation processing is performed;

one or more of a maximum channel spacing, a timing offset, a phase offset, a frequency error, or power imbalance between positioning frequency layers on which simultaneous measurement or aggregation processing is performed;

a frequency domain buffer capability type;

a capability for separately processing one positioning frequency layer;

a capability for performing aggregation processing on a plurality of positioning frequency layers;

whether beams of a plurality of positioning frequency layers are the same at a same moment;

whether a plurality of Inter band positioning frequency layers are the same at a same moment; or whether a plurality of Intra band discontinuous positioning frequency layers are the same at a same moment, wherein the types of the plurality of positioning frequency layers comprise:

intra-band continuous positioning frequency layers;

intra-band discontinuous positioning frequency layers; and inter-band discontinuous positioning frequency layers.

16. A non-transitory computer-readable storage medium, storing a computer program, when the computer program is executed by a processor, causes the processor to perform the method for reference signal resource processing according to claim 1.

17. A method for reference signal resource processing, performed by a network side device, comprising:

sending a measurement gap configuration to a terminal; and configuring information to be sent to the terminal for the terminal to simultaneously process first reference signal resources of multiple positioning frequency layers, wherein each first reference signal is used for positioning of the terminal aggregation instruction, wherein the first reference signal resources are discontinuous in a frequency domain, wherein the simultaneously processing first reference signal resources of multiple positioning frequency layers according to a configuration on a network side comprises:

according to the measurement gap configuration, simultaneously processing the first reference signal resources of the multiple positioning frequency layers in one measurement gap; or simultaneously processing the first reference signal resources of the multiple positioning frequency layers according to configuration information of the first reference signal, wherein:

the configuration information comprises information of a positioning frequency layer group, and processing the first reference signal resources of the multiple positioning frequency layers according to the configuration information comprises: performing aggregation processing on the first reference signal resources of the multiple positioning frequency layers in the positioning frequency layer group according to the information of the positioning frequency layer group.

18. A terminal, comprising:

a memory storing a computer program; and a processor coupled to the memory and configured to execute the computer program to perform operations comprising:

receiving a measurement gap configuration; and simultaneously processing first reference signal resources of multiple positioning frequency layers according to a configuration on a network side, wherein each first reference signal is used for positioning the terminal, wherein the first reference signal resources are discontinuous in a frequency domain, wherein the simultaneously processing first reference signal resources of multiple positioning frequency layers according to a configuration on a network side comprises:

according to the measurement gap configuration, simultaneously processing the first reference signal resources of the multiple positioning frequency layers in one measurement gap; or simultaneously processing the first reference signal resources of the multiple positioning frequency layers according to configuration information of the first reference signal, wherein:

the configuration information comprises information of a positioning frequency layer group, and processing the first reference signal resources of the multiple positioning frequency layers according to the configuration information comprises: performing aggregation processing on the first reference signal resources of the multiple positioning frequency layers in the positioning frequency layer group according to the information of the positioning frequency layer group.

19. A network side device, comprising:

a memory storing a computer program; and a processor coupled to the memory and configured to execute the computer program to perform the method according to claim 17.

\* \* \* \* \*